US012509306B2

(12) United States Patent
Minamino et al.

(10) Patent No.: US 12,509,306 B2
(45) Date of Patent: Dec. 30, 2025

(54) PACKAGE CONVEYANCE APPARATUS AND PACKAGE SUPPLY APPARATUS

(71) Applicant: KABUSHIKI KAISHA TOSHIBA, Tokyo (JP)

(72) Inventors: Yuhi Minamino, Kawasaki Kanagawa (JP); Reiya Asanuma, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 26 days.

(21) Appl. No.: 18/624,221

(22) Filed: Apr. 2, 2024

(65) Prior Publication Data
US 2024/0246773 A1 Jul. 25, 2024

Related U.S. Application Data

(63) Continuation of application No. PCT/JP2022/034925, filed on Sep. 20, 2022.

(30) Foreign Application Priority Data

Oct. 7, 2021 (JP) .................................. 2021-165459

(51) Int. Cl.
B65G 47/30 (2006.01)
B65G 47/31 (2006.01)

(52) U.S. Cl.
CPC .................................... B65G 47/31 (2013.01)

(58) Field of Classification Search
CPC ........ B65G 47/24; B65G 47/30; B65G 47/31; B65G 47/52
(Continued)

(56) References Cited

U.S. PATENT DOCUMENTS 5,950,800 A * 9/1999 Terrell ............... B65G 47/1492
198/452
6,259,967 B1 * 7/2001 Hartlepp ............ B65G 47/1492
198/444
(Continued)

FOREIGN PATENT DOCUMENTS

JP H4-243725 A 8/1992
JP H6-278842 A 10/1994
(Continued)

OTHER PUBLICATIONS

Japan Patent Office, Int'l Search Report for PCT/JP2022/034925, 2 pages (Dec. 13, 2022).
(Continued)

*Primary Examiner* — Douglas A Hess
(74) *Attorney, Agent, or Firm* — Finnegan, Henderson, Farabow, Garrett & Dunner, LLP

(57) ABSTRACT

In an embodiment, a package conveyance apparatus includes first, second, and third side-alignment conveyors each receiving packages conveyed in an irregularly arranged state in a conveyance direction and a direction intersecting the conveyance direction. The first, second, and third side-alignment conveyors convey the packages in first, second, and third conveyance directions while side-aligning the packages in first, second, and third directions, respectively. The package conveyance apparatus includes first, second, and third auxiliary conveyance belts provided on respective side-alignment direction sides of the first, second, and third side-alignment conveyors, applying conveyance force to the packages in the first, second, and third directions, respectively, and differing in conveyance speeds from the first, second, and third side-alignment conveyors, respectively.

11 Claims, 12 Drawing Sheets

(58) Field of Classification Search
USPC .......................................................... 198/443
See application file for complete search history.

(56) References Cited

U.S. PATENT DOCUMENTS

| | | | | |
|---|---|---|---|---|
| 6,269,933 | B1* | 8/2001 | Schuitema | B65G 47/5145 |
| | | | | 198/370.1 |
| 7,861,847 | B2* | 1/2011 | Fourney | B65G 17/24 |
| | | | | 198/433 |
| 8,528,742 | B2* | 9/2013 | Wargo | B65G 15/30 |
| | | | | 209/663 |
| 10,166,575 | B2* | 1/2019 | Schroader | B65G 15/00 |
| 10,315,859 | B1* | 6/2019 | Zhao | B65G 47/766 |
| 10,773,898 | B2* | 9/2020 | Perrot | B65G 43/08 |
| 10,815,073 | B1* | 10/2020 | Dwivedi | B65G 47/682 |
| 2001/0030102 | A1 | 10/2001 | Woltjer et al. | |
| 2002/0079194 | A1 | 6/2002 | Ydoate et al. | |
| 2019/0161285 | A1 | 5/2019 | Perrot et al. | |

FOREIGN PATENT DOCUMENTS

| | | |
|---|---|---|
| JP | H6-278843 A | 10/1994 |
| JP | 4125594 B2 | 6/2004 |
| JP | 2007-153484 A | 6/2007 |
| JP | 2016-145095 A | 8/2016 |
| JP | 2019-519449 A | 7/2019 |
| JP | 2020-132324 A | 8/2020 |

OTHER PUBLICATIONS

Canadian IP Office, Office Action in CA App. No. 3,233,667 (Aug. 27, 2025).

* cited by examiner

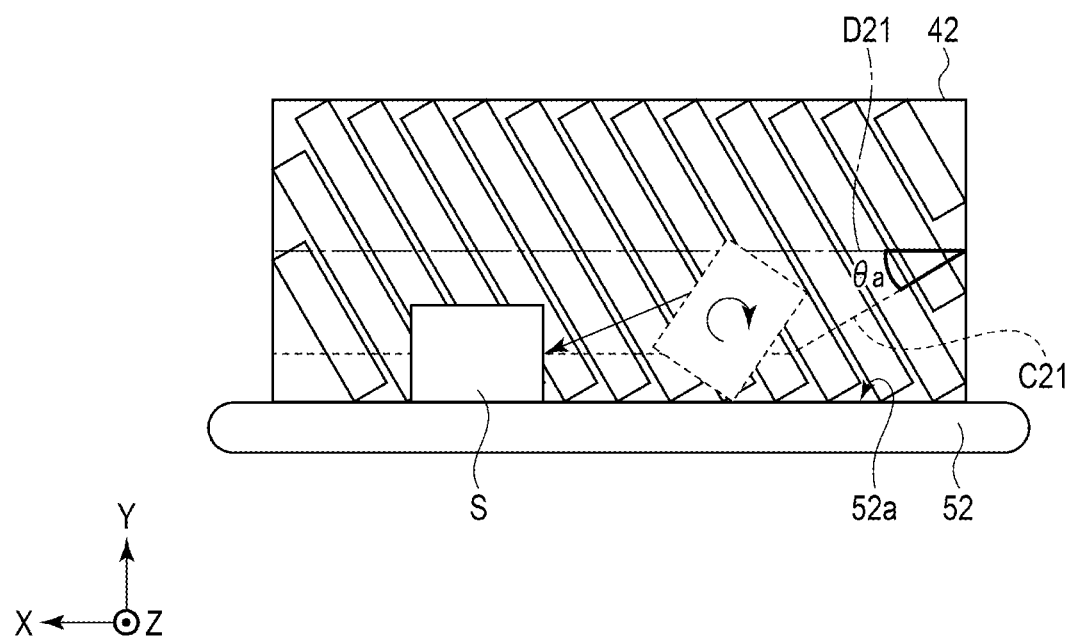
F I G. 7

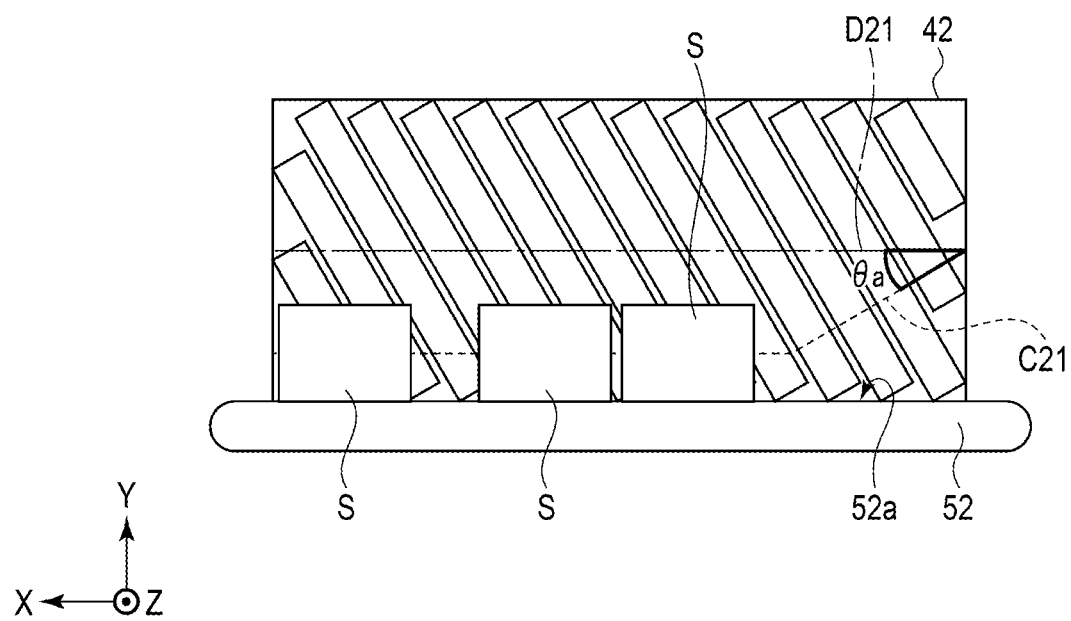
F I G. 8C

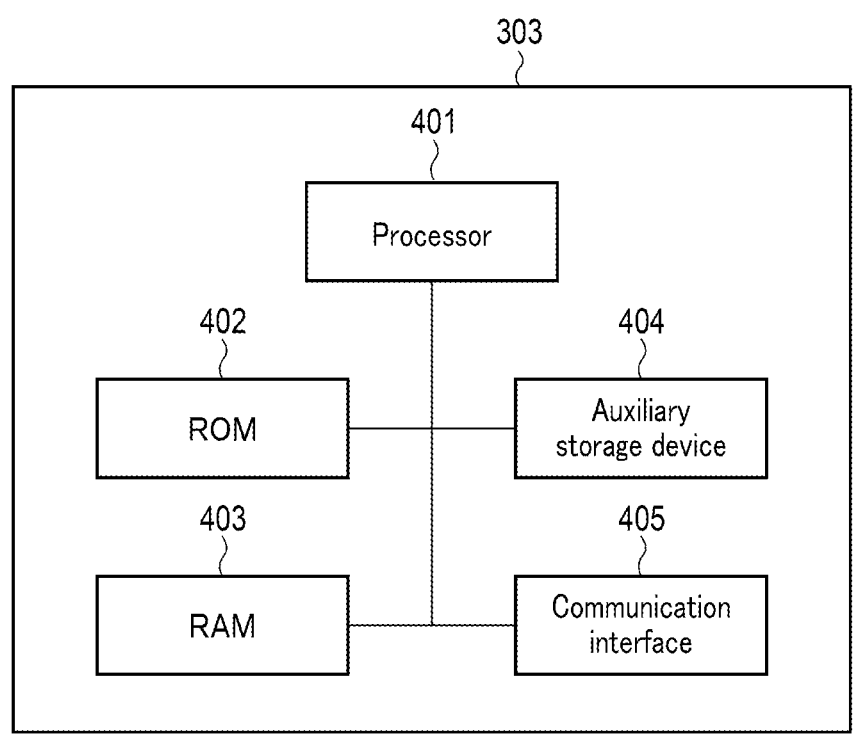
F I G. 10

PACKAGE CONVEYANCE APPARATUS AND PACKAGE SUPPLY APPARATUS

CROSS REFERENCE TO RELATED APPLICATIONS

This application is a Continuation Application of PCT Application No. PCT/JP2022/034925, filed Sep. 20, 2022, and based upon and claiming the benefit of priority from prior Japanese Patent Application No. 2021-165459, filed Oct. 7, 2021, the entire contents of all of which are incorporated herein by reference.

FIELD

Embodiments described herein relate generally to a package conveyance apparatus and a package supply apparatus.

BACKGROUND

There is provided a system for singulating and arranging articles such as packages supplied from the outside. The system includes a singulator that singulates and arranges articles, a conveyor that supplies the articles to the singulator, and the like.

BRIEF DESCRIPTION OF THE DRAWINGS

FIG. 7 is a schematic view illustrating an example in which one processing target is conveyed at the conveyance speed for which the conveyance speed of the first side-alignment conveyor according to the embodiment is lower than the conveyance speed of the auxiliary conveyance portion.

FIG. 8C continues on from FIG. 8B and is a schematic view illustrating the example in which the plurality of processing targets is conveyed at the conveyance speed for which the conveyance speed of the first side-alignment conveyor is lower than the conveyance speed of the auxiliary conveyance portion.

FIG. 10 is a block diagram illustrating an example of a configuration of a control apparatus according to the second embodiment.

DETAILED DESCRIPTION

Figure 1:
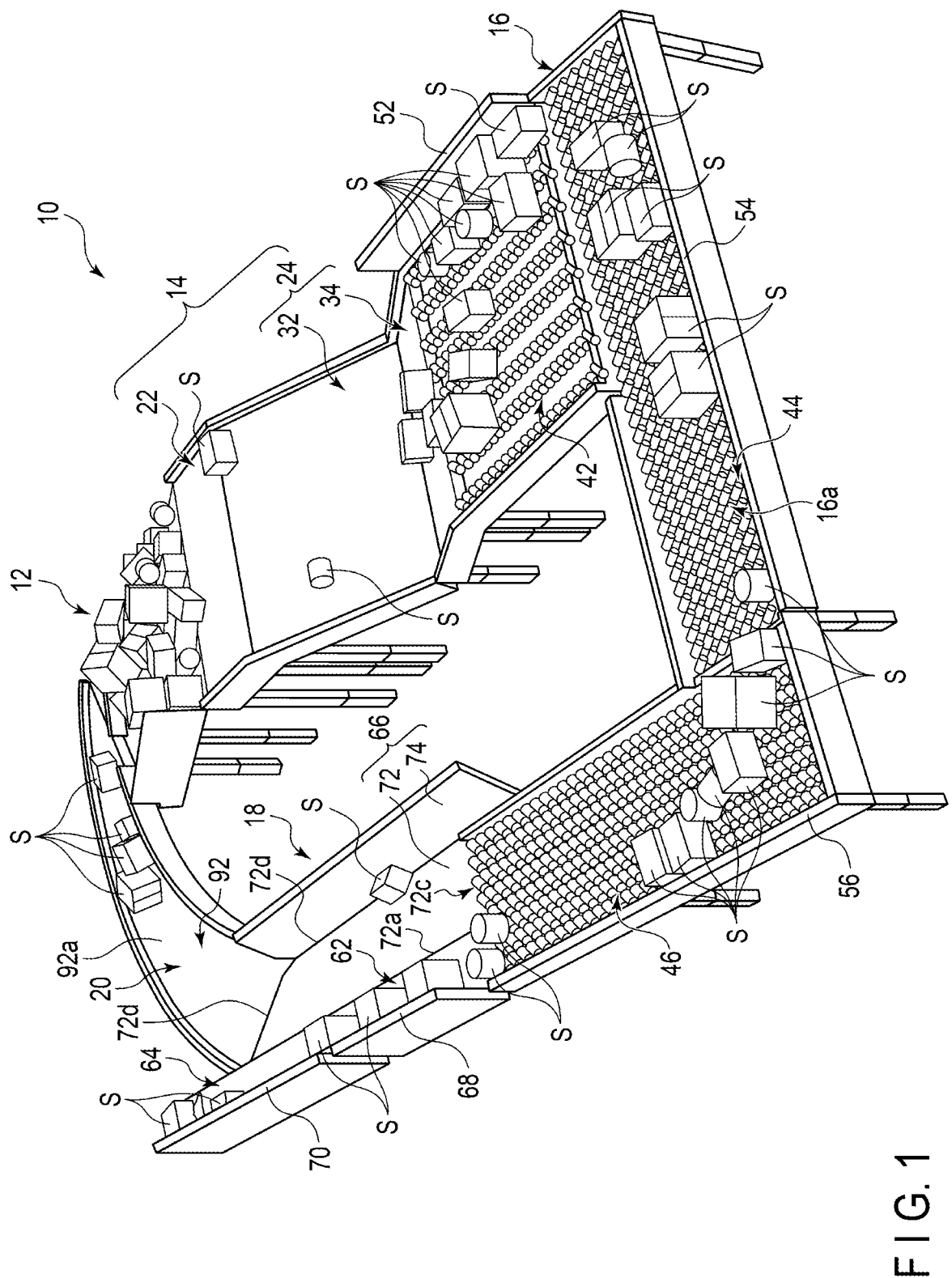
FIG. 1 is a schematic perspective view illustrating an operating state of a package supply apparatus according to an embodiment.

An object of an embodiment is to provide a package conveyance apparatus and a package supply apparatus that enable a package to be conveyed more efficiently.

According to the embodiment, a package conveyance apparatus, includes: a first side-alignment conveyor, a first auxiliary conveyance belt, a second side-alignment conveyor, a second auxiliary conveyance belt, a third side-alignment conveyor, and a third auxiliary conveyance belt. The first side-alignment conveyor is configured to receive a plurality of packages conveyed in a state where the packages are irregularly arranged in a conveyance direction and a direction intersecting the conveyance direction, convey the packages in a first conveyance direction, and convey the packages while side-aligning the packages in a first direction. The first auxiliary conveyance belt is provided on a side-alignment direction side of the first side-alignment conveyor, is configured to apply a conveyance force to the packages in the first direction, and has a conveyance speed different from a conveyance speed of the first side-alignment conveyor. The second side-alignment conveyor configured to receive the packages conveyed by the first side-alignment conveyor, convey the packages in a second conveyance direction intersecting the first side-alignment conveyor, and convey the packages while side-aligning the packages in a second direction. The second auxiliary conveyance belt is provided on a side-alignment direction side of the second side-alignment conveyor, is configured to apply a conveyance force to the packages in the second direction, and has a conveyance speed different from a conveyance speed of the second side-alignment conveyor. The third side-alignment conveyor configured to receive the packages conveyed by the second side-alignment conveyor, convey the packages in a third conveyance direction intersecting the second side-alignment conveyor, and convey the packages while side-aligning the packages in a third direction. The third auxiliary conveyance belt is provided on a side-alignment direction side of the third side-alignment conveyor, is configured to apply a conveyance force to the packages in the third direction, and has a conveyance speed different from a conveyance speed of the third side-alignment conveyor.

First Embodiment

A package supply apparatus 10 will be described hereinbelow with reference to the drawings.

The package supply apparatus (the load supply apparatus) 10 separates (divides up) a multi-layered load, and supplies the packages (processing targets) at a predetermined interval (a predetermined pitch) to a sorting apparatus (distribution sorter) that is configured to sort the packages by destination in a distribution system, for example. In addition, the supply apparatus (component supply apparatus) 10 is, for example, in part of a manufacturing line, and separates (divides up) a large number of components (processing targets) of the same type or different types, and supplies a package (processing targets) to a later-stage apparatus at predetermined time intervals (a predetermined pitch). That is, in the present embodiment, package is not limited to package in logistics, and components in a product manufacturing line are also included as an example of package.

The package supply apparatus according to an embodiment (hereinafter, simply referred to as the supply apparatus) 10 will be described with reference to FIGS. 1 to 3.

FIG. 1 is a schematic perspective view illustrating an operating state of the supply apparatus 10. FIG. 2 is a schematic view illustrating a state in which the supply apparatus 10 illustrated in FIG. 1 is viewed from above. An XYZ orthogonal coordinate system is defined in the supply apparatus 10 in FIG. 2. FIG. 3 illustrates a state in which the outside (one direction) is viewed from the inside (another direction) of the end, in the width direction orthogonal to the direction of extension, of a conveyance path. Therefore, FIG. 3 is a schematic view illustrating inclined states and height differences of a conveyance path along a direction of extension D when it is assumed that the directions of extension D (D10, D11, D12, D21, D22, D23, D31, D32) of a series of conveyance paths of the supply apparatus 10 illustrated in FIG. 2 are straight. FIG. 4 is a schematic view illustrating an article sorting apparatus (distribution sorter) 110 that processes processing targets S which are supplied from the supply apparatus 10.

Figure 2:
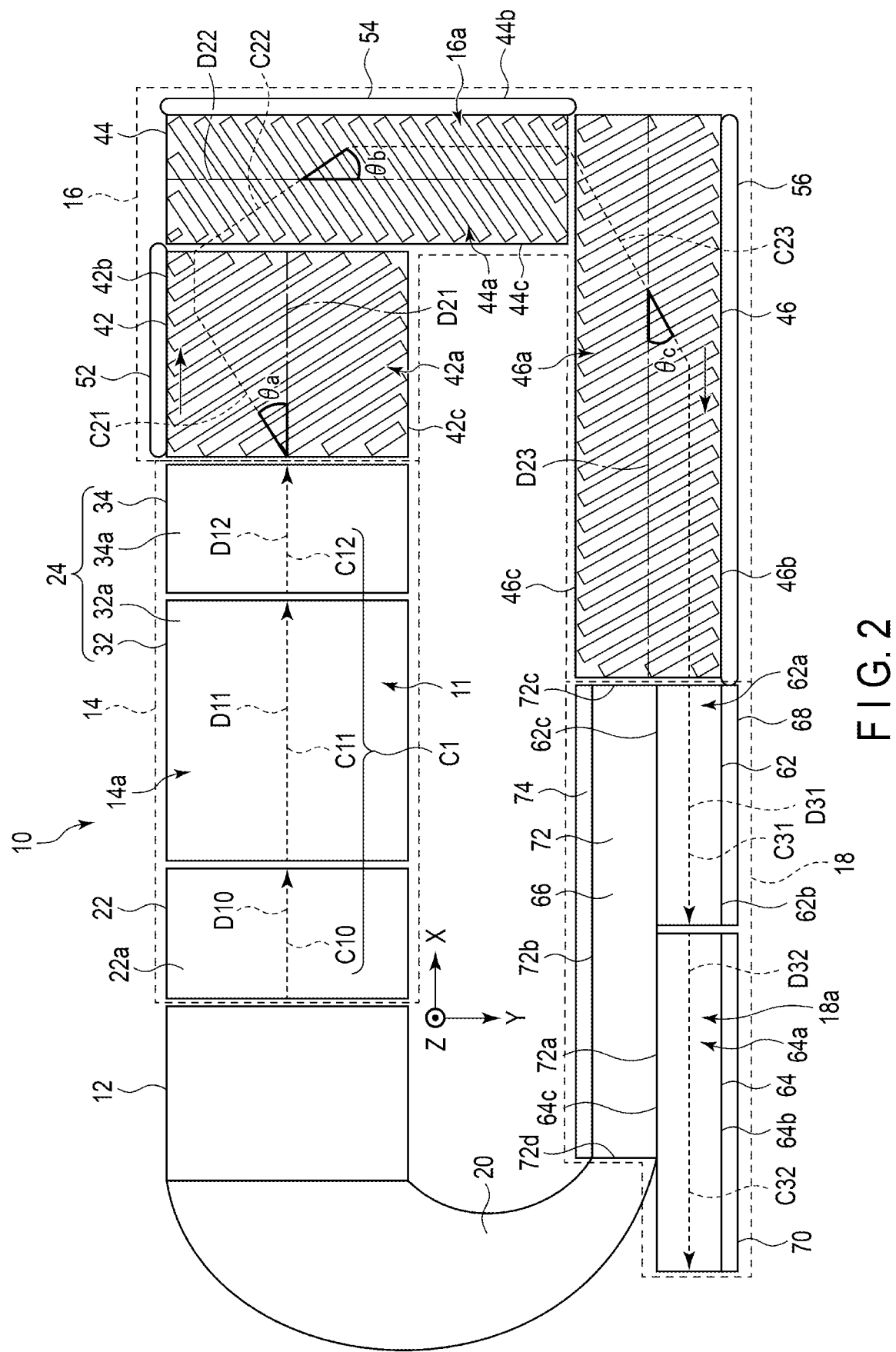
FIG. 2 is a schematic view illustrating a state in which the package supply apparatus illustrated in FIG. 1 is viewed from above.

As illustrated in FIGS. 1 and 2, the supply apparatus 10 includes a feeder 12 to which a plurality of processing targets S is inputted, a first conveyance portion 14 (first conveyance portion), a second conveyance portion 16 (conveyance apparatus), and a third conveyance portion 18 (second conveyance portion).

An example of the feeder 12 is a basket. For example, the plurality of processing targets S are stored in the feeder 12 because a tipper, into which the plurality of (large number of) processing targets S are fed, is inclined, thus causing the plurality of processing targets S to slide with respect to the tipper. The processing targets S placed in the feeder 12 then make contact with, for example, an upstream end of a first conveyance path 14a.

Note that, in the present embodiment, the end on the upstream side of the conveyance path itself is defined as the upstream end, and the end on the downstream side is defined as the downstream end.

The first conveyance portion 14 includes the first conveyance path 14a, which conveys the processing targets S from the upstream side to the downstream side along a predetermined conveyance direction C1 (C10, C11, C12). As illustrated in FIG. 2, the directions of extension D10, D11, and D12 of the first conveyance portion 14 are, taken as a whole, apparently straight along the X-axis direction, but as illustrated in FIG. 3, the directions of extension D11 and D12 are inclined with respect to the X-axis and the Z-axis along the plane ZX. The directions of extension D11, D12 are inclined with respect to a horizontal plane (ground).

The second conveyance portion 16 includes a second conveyance path 16a that is disposed on the downstream side of the first conveyance path 14a of the first conveyance portion 14, and that is bent in a U shape (including a J shape), for example. The second conveyance path 16a of the second conveyance portion 16 conveys the processing targets S from the upstream side to the downstream side, along predetermined conveyance directions C21, C22, and C23.

The third conveyance portion 18 includes a third conveyance path 18a that is disposed on the downstream side of the second conveyance path 16a and that conveys the processing targets S from the upstream side to the downstream side, along a conveyance direction C32. The third conveyance portion 18 is straight along the X-axis direction. For example, a package feeder 112 of the distribution sorter 110 of the distribution system illustrated in FIG. 4 is disposed on the downstream side of the third conveyance portion 18. A component feeder (not illustrated) of the manufacturing line may be disposed on the downstream side of the third conveyance portion 18 instead of the distribution sorter 110.

As illustrated in FIG. 2, when the supply apparatus 10 is viewed from above, the first conveyance portion 14 and the third conveyance portion 18 are separated from each other in the Y-axis direction. Therefore, the first conveyance portion 14 and the third conveyance portion 18 face each other with a space interposed therebetween. A horizontal component of the first conveyance path 14a, which is in the conveyance direction C1, and a horizontal component of the third conveyance path 18a, which is in the conveyance direction C32, are each straight. The horizontal component of the first conveyance path 14a, which is in the conveyance direction C1, and a horizontal component of the third conveyance path 18a, which is in the conveyance direction C32, are parallel (including substantially parallel) to each other and oriented in opposite directions.

The first conveyance portion 14 includes a first conveyor portion (removal conveyance portion) 22 adjacent to the downstream side of the feeder 12 along the X axis, and a second conveyor portion 24 disposed on the downstream side of the first conveyor portion 22 along the X axis. In the present embodiment, the first conveyor portion 22 includes a conveyance path 22a which is horizontal to a horizontal plane (ground) formed of, for example, an endless belt. The second conveyor portion 24 includes a first inclined conveyor (downward slanting conveyance portion) 32 including a conveyance path 32a which is inclined with respect to the horizontal plane as a downward slope formed of, for example, an endless belt, and a second inclined conveyor (upward slanting conveyance portion) 34 including a conveyance path 34a which is inclined with respect to the horizontal plane as an upward slope formed of, for example, an endless belt. The first inclined conveyor 32 is adjacent to the downstream side of the first conveyor portion 22. The second inclined conveyor 34 is adjacent to the downstream side of the first inclined conveyor 32. The first inclined conveyor (downward slanting conveyance portion) 32 is inclined downward along the conveyance direction C1 due to its downward slope. The second inclined conveyor (upward slanting conveyance portion) 34 is inclined upward along the conveyance direction C1 due to an upward incline.

The conveyance speed V10 along the conveyance direction C10 of the conveyance path 22a of the first conveyor portion 22 is equal to or higher than the conveyance speed V11 along the conveyance direction C11 of the conveyance path 32a of the first inclined conveyor 32 of the second conveyor portion 24. The conveyance speed V12 along the conveyance direction C12 of the conveyance path 34a of the second inclined conveyor 34 of the second conveyor portion 24 is equal to or higher than the conveyance speed V11 along the conveyance direction C11 of the conveyance path 32a of the first inclined conveyor 32 of the second conveyor portion 24.

Figure 3:
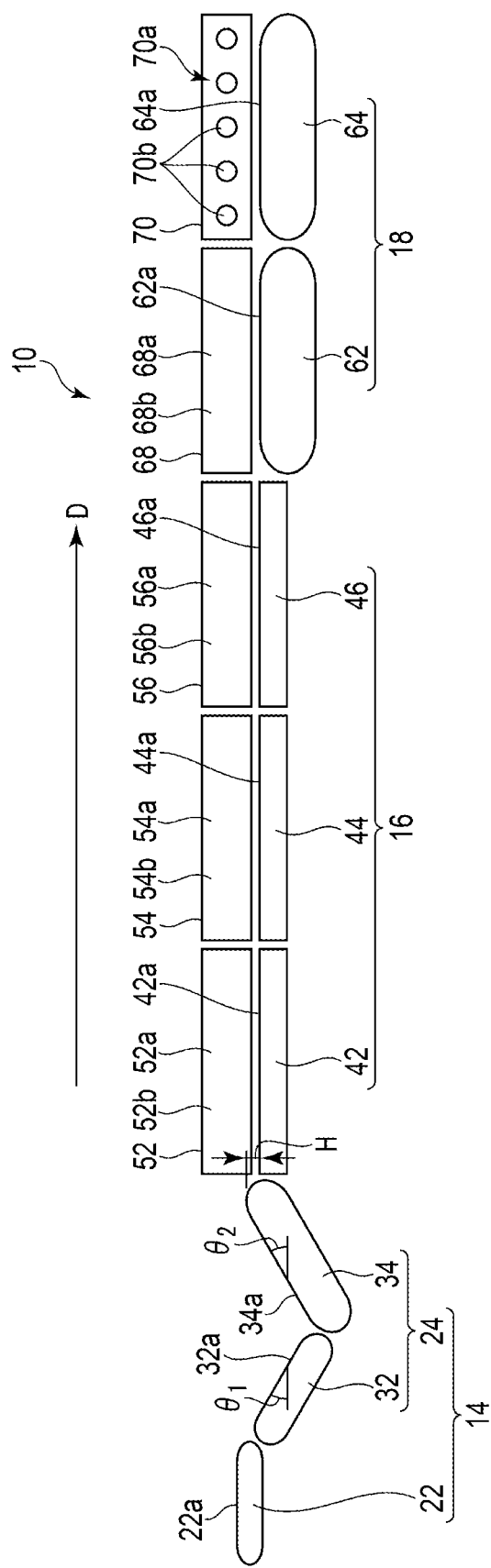
FIG. 3 is a schematic view illustrating a state of a conveyance path along a direction of extension in which the conveyance path of the package supply apparatus illustrated in FIGS. 1 and 2 extends.
Figure 4:
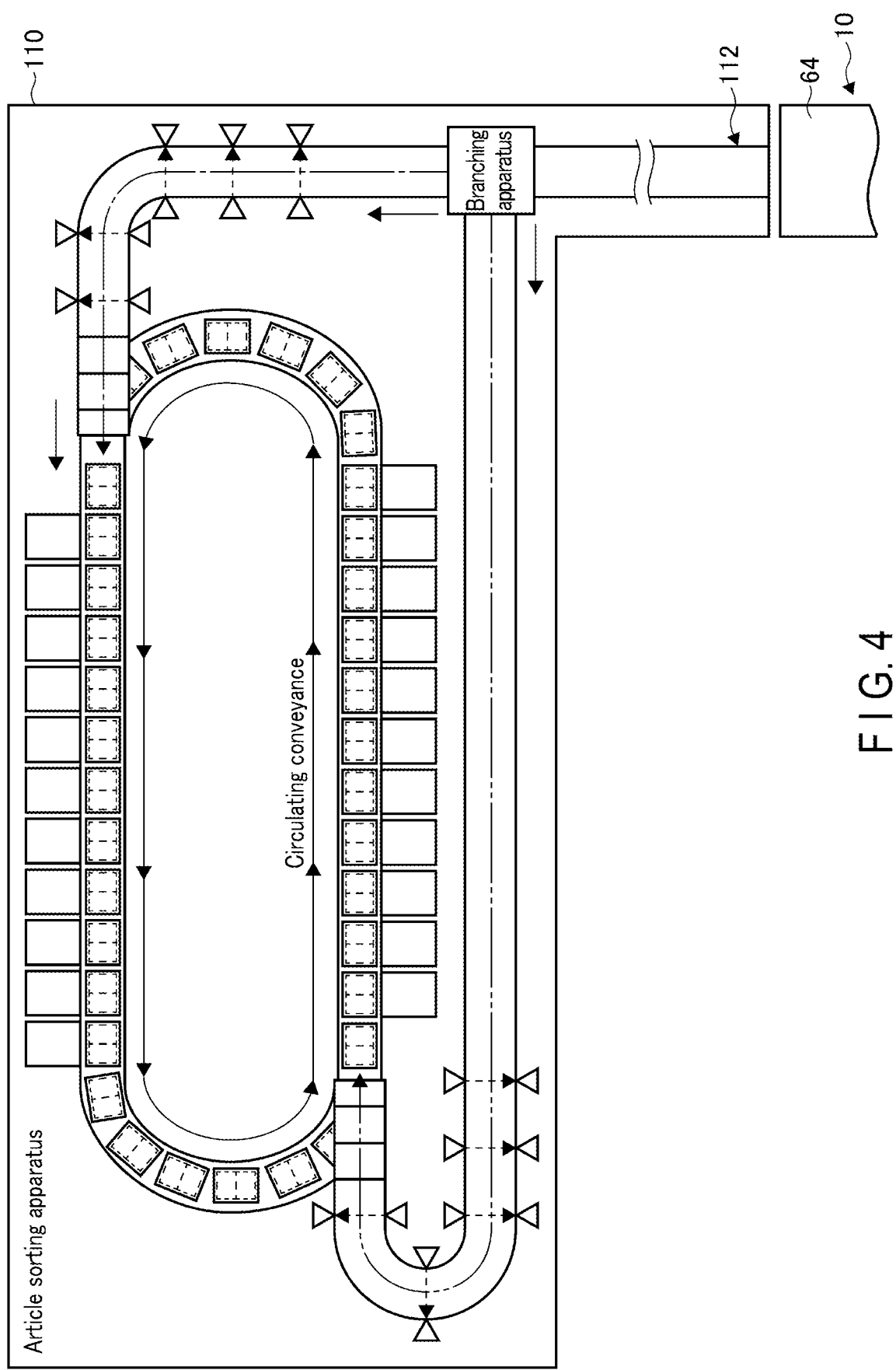
FIG. 4 is a schematic view illustrating an article sorting apparatus that processes processing targets which are supplied from the package supply apparatus illustrated in FIG. 1.

An inclination angle θ1 of the conveyance path 32a of the first inclined conveyor 32 with respect to the horizontal plane illustrated in FIG. 3 is preferably, for example, about 10° to 40°. An inclination angle θ2 of the conveyance path 34a of the second inclined conveyor 34 with respect to the horizontal plane is preferably, for example, about 10° to 40°.

The upstream end of the conveyance path 32a of the first inclined conveyor 32 is preferably slightly lower between the downstream end of the conveyance path 22a of the first conveyor portion 22 and the upstream end of the first inclined conveyor 32. In this case, the processing targets S are easily delivered between the conveyance path 22a of the first conveyor portion 22 and the conveyance path 32a of the first inclined conveyor 32.

As illustrated in FIGS. 1 and 2, the second conveyance portion 16 includes a first side-alignment conveyor (first side-alignment conveyance portion) 42, which is adjacent to the downstream side of the first conveyance portion 14 along the X axis, a second side-alignment conveyor (second side-alignment conveyance portion) 44, and a third side-alignment conveyor (third side-alignment conveyance portion) 46. In the second conveyance portion 16, the plurality of conveyors (conveyance portions) 42, 44, and 46 are connected so as to have mutually different directions of extension D21, D22, and D23 and conveyance directions C21, C22, and C23. The directions of extension D21, D22, and D23 of the plurality of conveyors 42, 44, and 46 of the second conveyance portion 16 are U-shaped overall. The three conveyors 42, 44, and 46 may be arranged adjacent to each other, and do not need to be integrated as one conveyor.

The first side-alignment conveyor 42 of the second conveyance portion 16 is installed on the downstream side of the first conveyance portion 14 along the conveyance direction C1. The first side-alignment conveyor 42 conveys the processing targets S in the first conveyance direction (direction along the direction of extension D21). The second side-alignment conveyor 44 is installed on the downstream side of the first side-alignment conveyor 42 along a direction intersecting the first side-alignment conveyor 42. The second side-alignment conveyor 44 conveys the processing targets S in the second conveyance direction (direction along the direction of extension D22). The third side-alignment conveyor 46 is installed on the downstream side of the second side-alignment conveyor 44 along a direction intersecting the second side-alignment conveyor 44. The third side-alignment conveyor 46 conveys the processing targets S in the third conveyance direction (direction along the direction of extension D23).

The first side-alignment conveyor 42 receives the processing targets S conveyed in a state where the plurality of processing targets (packages) S is irregularly arranged in the conveyance direction and the direction intersecting the conveyance direction, conveys the processing targets S in the first conveyance direction, and conveys the processing targets S while side-aligning the processing targets S in the first direction C21. For example, as illustrated in FIG. 2, when the supply apparatus 10 is viewed from above, the first side-alignment conveyor 42 extends along the direction of extension D21. The direction of extension D21 of the first side-alignment conveyor 42 substantially coincides with a horizontal component of the first conveyance portion 14, which is in the predetermined conveyance direction C1. The conveyance path 42a of the first side-alignment conveyor 42 is, for example, parallel to the plane XY. The conveyance direction (first direction) C21 of the processing targets S according to the conveyance path 42a of the first side-alignment conveyor 42 is shifted from the horizontal component in the conveyance direction C1. An inclined roller conveyor, for example, is used as the first side-alignment conveyor 42. The conveyance direction C21 is inclined at an inclination angle θa with respect to the direction of extension D21 of the conveyance path 42a of the first side-alignment conveyor 42. The inclination angle θa is preferably, for example, about 10° to 40°. Therefore, the first side-alignment conveyor 42 is configured to convey the processing targets S placed on the conveyance path 42a of the first side-alignment conveyor 42 in the conveyance direction along the direction of extension D21, and is configured to align the processing targets S in one direction in the width direction orthogonal to the direction of extension D21, that is, of aligning the processing targets S with one end 42b. Hereinafter, the direction in which the side-alignment conveyor conveys the packages to one side of the side-alignment conveyor during conveying the packages is referred to as the side-alignment direction.

At an end (outside end) 42b in one direction in the width direction orthogonal to the direction of extension D21 of the first side-alignment conveyor 42, a first wall portion 52 serving as a wall that prevents the processing targets S from falling off from one direction of the first side-alignment conveyor 42 is provided. The first wall portion 52 extends, for example, parallel to the direction of extension D21 of the conveyance path 42a of the first side-alignment conveyor 42. Due to the presence of the first wall portion 52, the processing targets S are prevented from falling off from the end in one direction of the first side-alignment conveyor 42.

The first wall portion 52 includes an auxiliary conveyance portion 52a (first auxiliary conveyance belt) that actively conveys the processing targets S from the upstream side toward the downstream side of the conveyance path 42a of the first side-alignment conveyor 42 in the conveyance direction along the direction of extension D21. The auxiliary conveyance portion 52a of the first wall portion 52 is provided on the side-alignment direction side of the first side-alignment conveyor 42, and applies a conveyance force to the package in the first conveyance direction along the direction of extension D21. For example, the auxiliary conveyance portion 52a of the first wall portion 52 is oriented toward the other end (inside end) 42c in the width direction orthogonal to the direction of extension D21 of the first side-alignment conveyor 42.

In addition, the auxiliary conveyance portion 52a of the first wall portion 52 has a higher frictional force with the package than the first side-alignment conveyor 42. The auxiliary conveyance portion 52a includes an endless belt similar to that used in, for example, a belt conveyor. As a result, because the auxiliary conveyance portion 52a having the endless belt has a higher frictional force than the roller conveyor, the auxiliary conveyance portion 52a is likely to have an affect on the conveyance behavior, such as acceleration/deceleration and rotation, of the processing targets S in contact with the auxiliary conveyance portion 52a. Further, the normal direction of a conveyance surface 52b of the endless belt is, for example, horizontal and faces the inside (other direction) in the width direction. As illustrated in FIG. 3, a step H of, for example, about 10 cm is preferably formed between the downstream end of the second inclined conveyor 34 and the upstream end of the first side-alignment conveyor 42.

The second side-alignment conveyor 44 receives the package conveyed by the first side-alignment conveyor 42, conveys the package in a second conveyance direction intersecting with the first side-alignment conveyor 42, and conveys the package while side-aligning the package in the second direction C22. For instance, the second side-alignment conveyor 44 extends in a direction along the Y axis which is, for example, orthogonal to the direction of extension D21 (direction along the X axis) of the first side-alignment conveyor 42. However, the second side-alignment conveyor 44 and the first side-alignment conveyor 42 do not need to be completely orthogonal to each other, and may intersect each other at a certain angle. The conveyance path 44a of the second side-alignment conveyor 44 is, for example, parallel to the plane XY. An inclined roller conveyor, for example, is used as the second side-alignment conveyor 44. The conveyance direction (second direction) C22 of the processing targets S according to the conveyance path 44a of the second side-alignment conveyor 44 is inclined at an inclination angle θb with respect to the direction of extension D22 of the second side-alignment conveyor 44. The inclination angle θb is preferably, for example, about 10° to 40°. Therefore, the second side-alignment conveyor 44 is configured to convey the processing targets S placed on the conveyance path 44a of the second side-alignment conveyor 44 in the conveyance direction along the direction of extension D22, and is configured to align the processing targets S in one direction in the width direction orthogonal to the direction of extension D22, that is, of aligning the processing targets S with one end 44b.

A second wall portion 54 serving as a wall that prevents the processing targets S from falling off from one direction from the second side-alignment conveyor 44 is provided at an end (outside end) 44b in one direction in the width direction orthogonal to the direction of extension D22 of the second side-alignment conveyor 44. The second wall portion 54 extends, for example, parallel to the direction of extension D22 of the conveyance path 44a of the second side-alignment conveyor 44. Due to the presence of the second wall portion 54, the processing targets S are prevented from falling off from the second side-alignment conveyor 44.

The second wall portion 54 includes an auxiliary conveyance portion 54a (second auxiliary conveyance belt) that actively conveys the processing targets S from the upstream side toward the downstream side of the conveyance path 44a of the second side-alignment conveyor 44 in the conveyance direction along the direction of extension D22. For example, the auxiliary conveyance portion 54a of the second wall portion 54 is oriented toward the other end (inside end) 44c in the width direction orthogonal to the direction of extension D22 of the second side-alignment conveyor 44.

The auxiliary conveyance portion 54a is formed similarly to the auxiliary conveyance portion 52a, for example. The auxiliary conveyance portion 54a of the second wall portion 54 is provided on the side-alignment direction side of the second side-alignment conveyor 44, and applies a conveyance force to the package in the second conveyance direction along the direction of extension D22. In addition, the auxiliary conveyance portion 54a has a higher frictional force with the package than the second side-alignment conveyor 44. For example, the auxiliary conveyance portion 54a of the second wall portion 54 operates such that the conveyance surface 54b of the endless belt of the auxiliary conveyance portion 54a moves the processing targets S from the upstream side to the downstream side, parallel to the second direction of extension D22.

The third side-alignment conveyor 46 receives the package conveyed by the second side-alignment conveyor 44, conveys the package in a third conveyance direction intersecting with the second side-alignment conveyor 44, and conveys the package while side-aligning the package in the third direction C23. For example, the third side-alignment conveyor 46 is adjacent to the downstream side of the second side-alignment conveyor 44 along the Y axis. The third side-alignment conveyor 46 extends, for example, in a direction orthogonal to the direction of extension D22 of the second side-alignment conveyor 44. However, the third side-alignment conveyor 46 and the second side-alignment conveyor 44 do not need to be completely orthogonal to each other, and may intersect each other at a certain angle. The conveyance path 46a of the third side-alignment conveyor 46 is, for example, parallel to the plane XY. An inclined roller conveyor, for example, is used as the third side-alignment conveyor 46. The conveyance direction (third direction) C23 of the processing targets S according to the conveyance path 46a of the third side-alignment conveyor 46 is inclined at an inclination angle θc with respect to the direction of extension D23 of the third side-alignment conveyor 46. The inclination angle θc is preferably, for example, about 10° to 40°. Therefore, the third side-alignment conveyor 46 is configured to convey the processing targets S placed on the conveyance path 46a of the third side-alignment conveyor 46 in the conveyance direction along the direction of extension D23, and is configured to align the processing targets S in one direction in the width direction orthogonal to the direction of extension D23, that is, of aligning the processing targets S with one end 46b.

A third wall portion 56 serving as a wall that prevents the processing targets S from falling off from one direction of the third side-alignment conveyor 46 is provided at an end (outside end) 46b in one direction in the width direction orthogonal to the direction of extension D23 of the third side-alignment conveyor 46. The third wall portion 56 extends, for example, parallel to the direction of extension D23 of the conveyance path 46a of the third side-alignment conveyor 46. Due to the presence of the third wall portion 56, the processing targets S are prevented from falling off from the third side-alignment conveyor 46.

The third wall portion 56 includes an auxiliary conveyance portion 56a (third auxiliary conveyance belt) that actively conveys the processing targets S from the upstream side toward the downstream side of the conveyance path 46a of the third side-alignment conveyor 46 in the conveyance direction along the direction of extension D23. For example, the auxiliary conveyance portion 56a of the third wall portion 56 is oriented toward the other end (inside end) 46c in the width direction orthogonal to the direction of extension D23 of the third side-alignment conveyor 46.

The auxiliary conveyance portion 56a is formed similarly to the auxiliary conveyance portions 52a, 54a, for example. The auxiliary conveyance portion 56a of the third wall portion 56 is provided on the side-alignment direction side of the third side-alignment conveyor 46, and applies a conveyance force to the package in the third conveyance direction along the direction of extension D23. In addition, the auxiliary conveyance portion 56a has a higher frictional force with the package than the third side-alignment conveyor 46. Therefore, the conveyance surface 56b of the endless belt of the auxiliary conveyance portion 56a moves the processing targets S from the upstream side to the downstream side, parallel to the third direction of extension D23.

Note that, in FIG. 2, an example is illustrated in which the conveyance direction C21 bends at the first side-alignment conveyor 42, the direction C22 bends at the second side-alignment conveyor 44, and the direction C23 bends at the third side-alignment conveyor 46. Because the starting points of the conveyance directions C21, C22, and C23 are located at the center in the width direction of the side-alignment conveyors 42, 44, and 46, respectively, in a case where the processing targets S is disposed on the inner ends 42c, 44c, and 46c side of the upstream ends of the side-alignment conveyors 42, 44, and 46, the bending position can be located on the downstream side of the position illustrated in FIG. 2, or does not bend.

Here, the conveyance speed of the second conveyance portion 16 will be described. First, a description will be provided, with reference to FIGS. 5, 6A to 6C, 7, and 8A to 8C, of the speed difference between the side-alignment conveyor and the auxiliary conveyance portion (auxiliary conveyance belt), taking the first side-alignment conveyor 42 and the auxiliary conveyance portion 52a as an example. The conveyance speed of the side-alignment conveyor 42 represents a conveyance speed component in the conveyance direction along the direction of extension D21. In FIGS. 5 and 6A to 6C, the conveyance speed of the first side-alignment conveyor 42 conveys the processing targets S at a speed higher than the conveyance speed of the auxiliary conveyance portion 52a, for example, at twice the conveyance speed. In FIGS. 7 and 8A to 8C, the conveyance speed of the first side-alignment conveyor 42 is lower than the conveyance speed of the auxiliary conveyance portion 52a, for example, the processing targets S is conveyed at a half speed.

Figure 5:
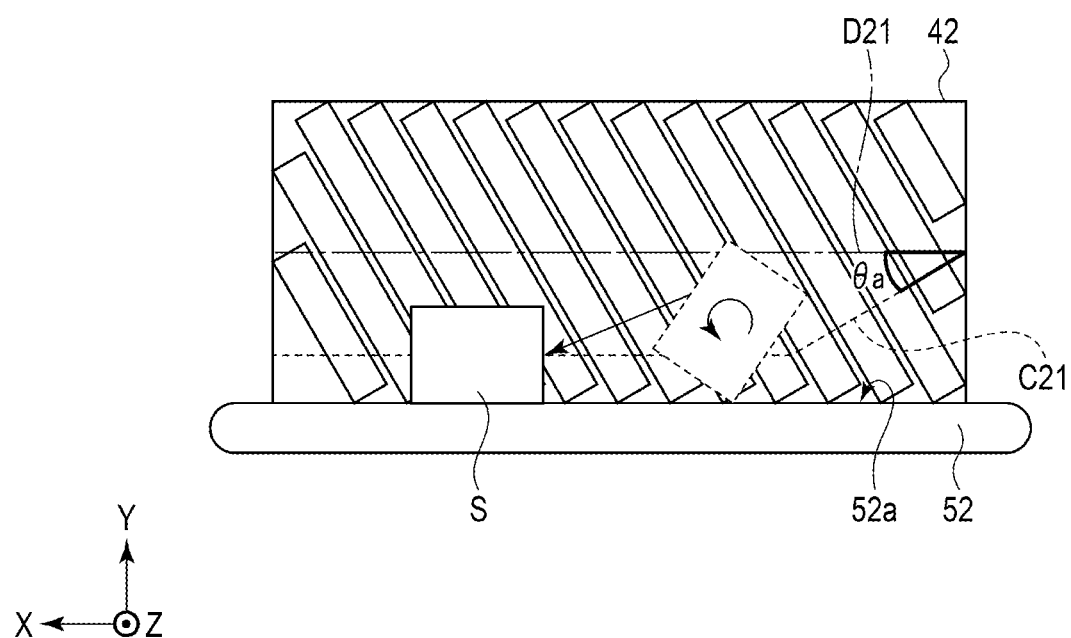
FIG. 5 is a schematic view illustrating an example in which one processing target is conveyed at a conveyance speed for which the conveyance speed of a first side-alignment conveyor according to the embodiment is higher than the conveyance speed of an auxiliary conveyance portion.

FIG. 5 is a schematic view illustrating an example in which one processing targets S is conveyed at a conveyance speed for which the conveyance speed of the first side-alignment conveyor 42 according to the embodiment is higher than the conveyance speed of the auxiliary conveyance portion 52a. For example, the processing targets S is conveyed while being rotated in the counterclockwise direction about the Z axis by the frictional force applied to the portion in contact with the auxiliary conveyance portion 52a. As a result, the processing targets S is conveyed while rotating such that the center of gravity moves in the side-alignment direction.

Figure 6A:
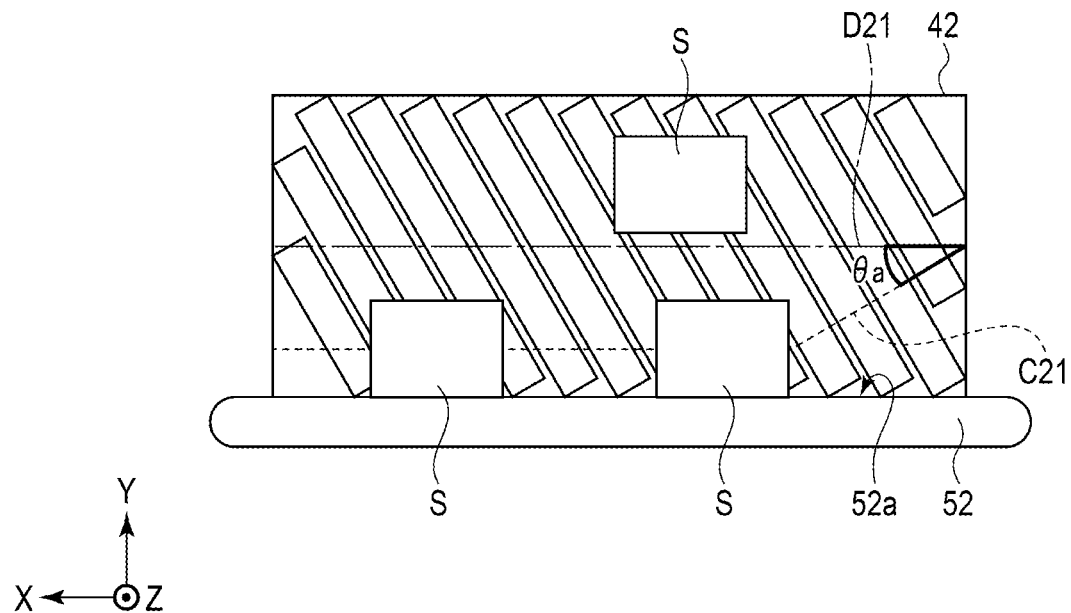
FIG. 6A is a schematic view illustrating an example in which a plurality of processing targets is conveyed at a conveyance speed for which the conveyance speed of the first side-alignment conveyor according to the embodiment is higher than the conveyance speed of the auxiliary conveyance portion.
Figure 6B:
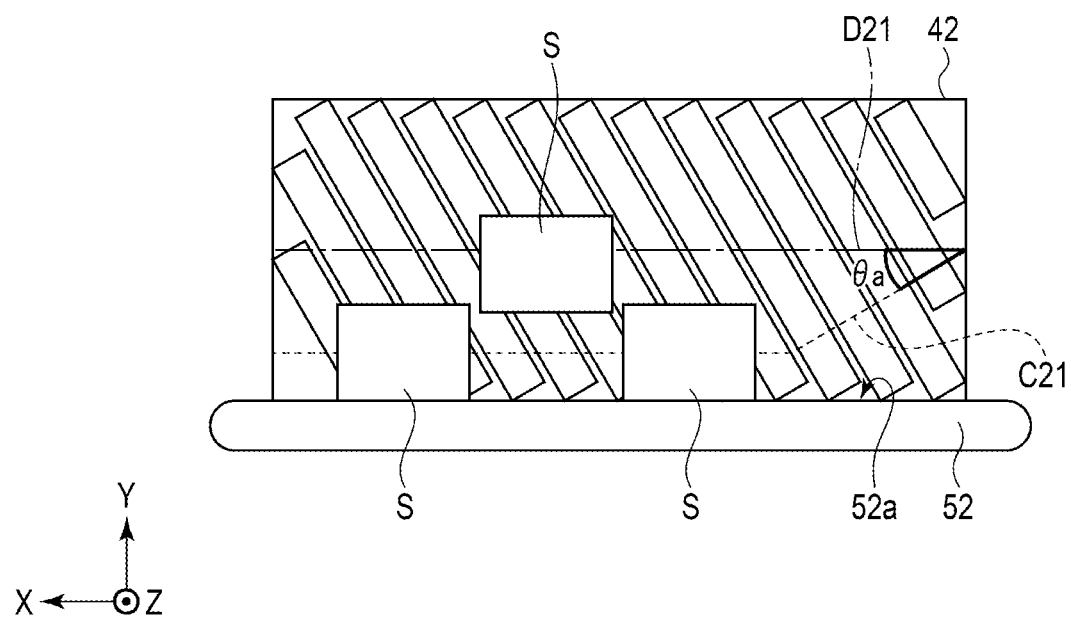
FIG. 6B continues on from FIG. 6A and is a schematic view illustrating the example in which the plurality of processing targets is conveyed at the conveyance speed for which the conveyance speed of the first side-alignment conveyor is higher than the conveyance speed of the auxiliary conveyance portion.
Figure 6C:
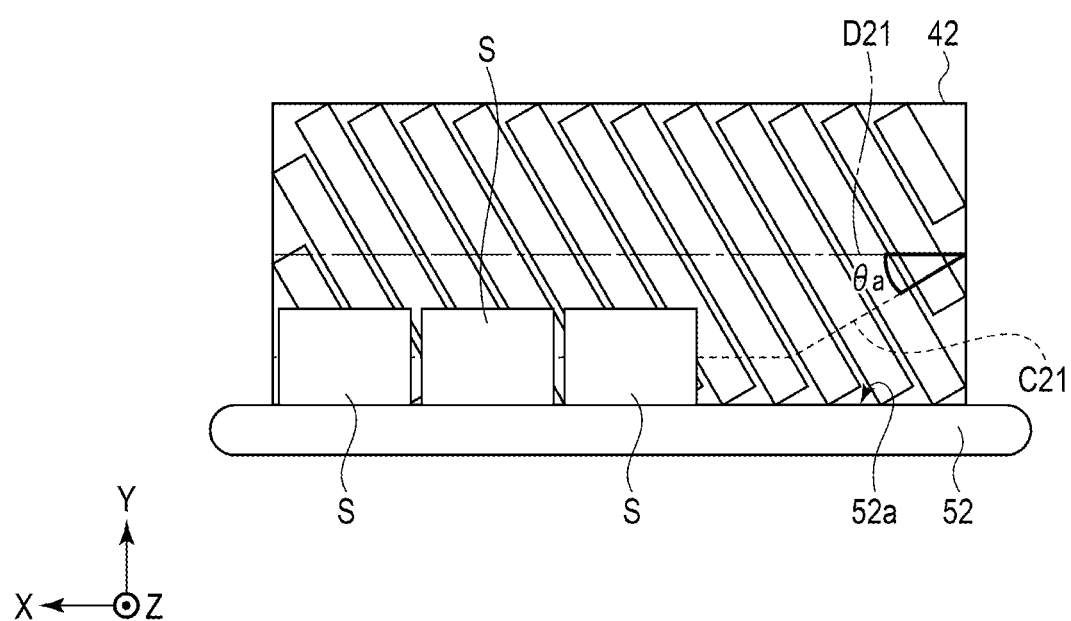
FIG. 6C continues on from FIG. 6B and is a schematic view illustrating the example in which the plurality of processing targets is conveyed at the conveyance speed for which the conveyance speed of the first side-alignment conveyor is higher than the conveyance speed of the auxiliary conveyance portion.

FIGS. 6A to 6C are schematic views illustrating an example in which the plurality of processing targets S are conveyed at a conveyance speed for which the conveyance speed of the first side-alignment conveyor 42 according to the embodiment is higher than the conveyance speed of the auxiliary conveyance portion 52a. For example, the processing targets S is conveyed by the first side-alignment conveyor 42 and the auxiliary conveyance portion 52a, and hence the state transitions from the state of FIG. 6A to the state of FIG. 6B, and then transitions to the state of FIG. 6C. The processing targets S in contact with the auxiliary conveyance portion 52a is conveyed at a conveyance speed lower than that of the processing targets S not in contact with the auxiliary conveyance portion by a frictional force applied to a portion in contact with the auxiliary conveyance portion 52a. As a result, the processing targets S that are not in contact with the auxiliary conveyance portion 52a are conveyed while being side-aligned in the side-alignment direction by the first side-alignment conveyor 42, and therefore it is possible to arrange these processing targets S into a line due to the processing targets entering between two processing targets S that are in contact with the auxiliary conveyance portion 52a. In addition, because processing targets S not in contact with the auxiliary conveyance portion 52a enter, in order from the downstream side of the conveyance path, between the processing targets S in contact with the auxiliary conveyance portion 52a, the processing targets S can be arranged side by side in a dense manner.

FIG. 7 is a schematic view illustrating an example in which one processing targets S is conveyed at a conveyance speed for which the conveyance speed of the first side-alignment conveyor 42 according to the embodiment is lower than the conveyance speed of the auxiliary conveyance portion 52a. For example, the processing targets S is conveyed while being rotated in the clockwise direction about the Z axis by the frictional force applied to the portion in contact with the auxiliary conveyance portion 52a. As a result, the processing targets S is conveyed while rotating such that the center of gravity moves in the side-alignment direction.

Figure 8A:
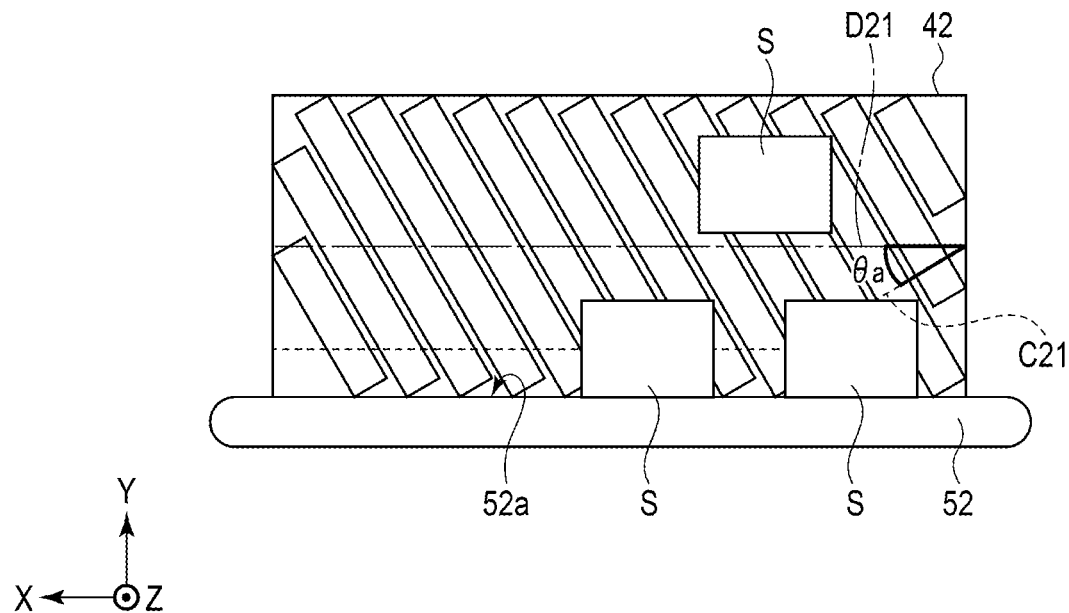
FIG. 8A is a schematic view illustrating an example in which a plurality of processing targets is conveyed at a conveyance speed for which the conveyance speed of the first side-alignment conveyor according to the embodiment is lower than the conveyance speed of the auxiliary conveyance portion.
Figure 8B:
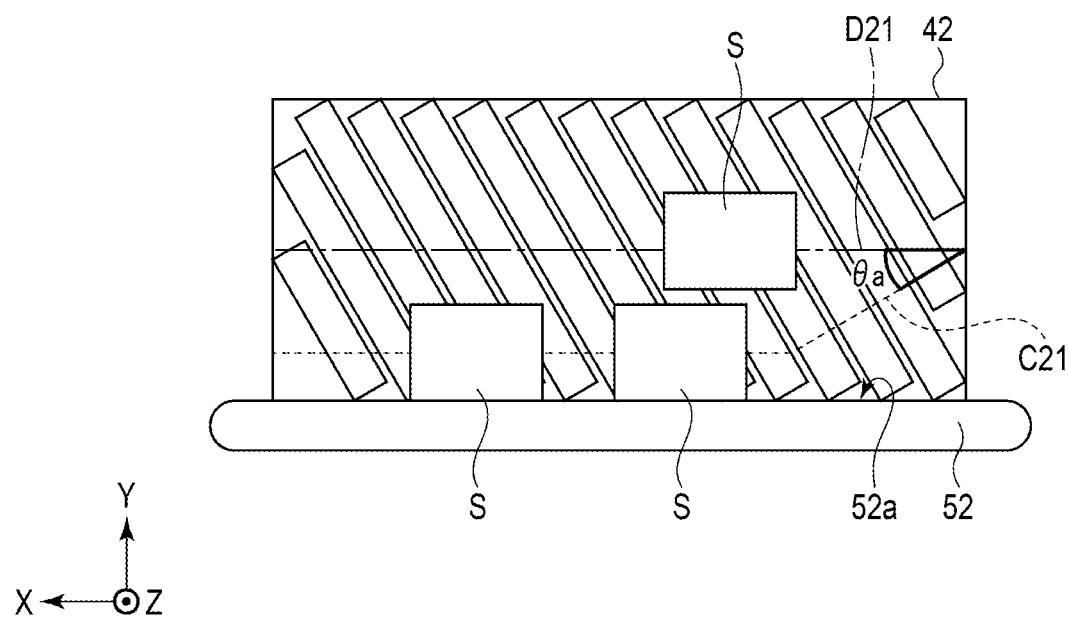
FIG. 8B continues on from FIG. 8A and is a schematic view illustrating the example in which the plurality of processing targets is conveyed at the conveyance speed for which the conveyance speed of the first side-alignment conveyor is lower than the conveyance speed of the auxiliary conveyance portion.

FIGS. 8A to 8C are schematic views illustrating an example in which the plurality of processing targets S are conveyed at a conveyance speed for which the conveyance speed of the first side-alignment conveyor 42 according to the embodiment is lower than the conveyance speed of the auxiliary conveyance portion 52a. For example, the processing targets S is conveyed by the first side-alignment conveyor 42 and the auxiliary conveyance portion 52a, and hence the state transitions from the state of FIG. 8A to the state of FIG. 8B, and then transitions to the state of FIG. 8C. The processing targets S in contact with the auxiliary conveyance portion 52a is conveyed at a conveyance speed higher than that of the processing targets S not in contact with the auxiliary conveyance portion 52a by a frictional force applied to a portion in contact with the auxiliary conveyance portion 52a. As a result, the processing targets S that are not in contact with the auxiliary conveyance portion 52a are conveyed while being side-aligned in the side-alignment direction by the side-alignment conveyor, and therefore it is possible to arrange these processing targets S into a line due to the processing targets entering behind processing targets S that are in contact with the auxiliary conveyance portion 52a. In addition, because processing targets S not in contact with the auxiliary conveyance portion 52a enter, in order from the upstream side of the conveyance path, behind the processing targets S in contact with the auxiliary conveyance portion 52a, the processing targets S can be arranged in a line in an efficient manner.

Next, the conveyance speed of each conveyance path of the second conveyance portion 16 will be described. Assuming that the conveyance speed along the conveyance direction (the first direction) C21 according to the conveyance path 42a of the first side-alignment conveyor 42 is V21, the conveyance path 42a of the first side-alignment conveyor 42 moves the processing targets S along the direction of extension D21 of the first side-alignment conveyor 42 at a speed of $V21 \cdot \cos \theta a$. The conveyance speed V21 along the conveyance direction C21 of the conveyance path 42a of the first side-alignment conveyor 42 is preferably higher than the conveyance speed V12 along the conveyance direction C12 of the conveyance path 34a of the second inclined conveyor 34.

The conveyance speed of the auxiliary conveyance portion 52a of the first wall portion 52 is variable, and has a conveyance speed different from the conveyance speed of the first side-alignment conveyor 42. The conveyance surface 52b of the endless belt of the auxiliary conveyance portion 52a operates to move the processing targets S from the upstream side to the downstream side, parallel to the first direction of extension D21. In order to arrange the processing targets S conveyed by the second inclined conveyor 34 in a line, the first side-alignment conveyor 42 operates to move the processing targets S such that the conveyance speed of the auxiliary conveyance portion 52a is twice the speed of the first side-alignment conveyor 42. That is, the conveyance speed of the auxiliary conveyance portion 52a is higher than that of the first side-alignment conveyor 42.

Assuming that the conveyance speed along the conveyance direction (second direction) C22 according to the conveyance path 44a of the second side-alignment conveyor 44 is V22, the conveyance path 44a of the second side-alignment conveyor 44 operates to move the processing targets S along the direction of extension D22 of the second side-alignment conveyor 44 at a speed of V22·cos θb (≥V21·cos θa). The conveyance speed V22 along the conveyance direction C22 of the conveyance path 44a of the second side-alignment conveyor 44 is preferably higher than the conveyance speed V21 along the conveyance direction C21 of the conveyance path 42a of the first side-alignment conveyor 42. That is, the conveyance speed of the second side-alignment conveyor 44 is higher than the conveyance speed of the first side-alignment conveyor 42.

The conveyance speed of the auxiliary conveyance portion 54a of the second wall portion 54 is variable, and has a conveyance speed different from the conveyance speed of the second side-alignment conveyor 44. The conveyance surface 54b of the endless belt of the auxiliary conveyance portion 54a operates to move the processing targets S from the upstream side to the downstream side, parallel to the second direction of extension D22. In order to further arrange the processing targets S conveyed by the first side-alignment conveyor 42 into a line, the second side-alignment conveyor 44 operates to move the processing targets S such that the conveyance speed of the auxiliary conveyance portion 54a is twice the conveyance speed of the second side-alignment conveyor. That is, the conveyance speed of the auxiliary conveyance portion 54a is higher than the conveyance speed of the second side-alignment conveyor 44.

Assuming that the conveyance speed along the conveyance direction (third direction) C23 according to the conveyance path 46a of the third side-alignment conveyor 46 is V23, the conveyance path 46a of the third side-alignment conveyor 46 operates to move the processing targets S along the direction of extension D23 of the third side-alignment conveyor 46 at a speed of V23·cos θc (≤V22·cos θb). The conveyance speed V23 along the conveyance direction C23 of the conveyance path 46a of the third side-alignment conveyor 46 is preferably lower than the conveyance speed V22 along the conveyance direction C22 of the conveyance path 44a of the second side-alignment conveyor 44. That is, the conveyance speed of the second side-alignment conveyor 44 is higher than the conveyance speed of the third side-alignment conveyor 46.

In addition, in a case where, in the conveyance of the package, the downstream conveyor is at a lower speed than the upstream conveyor, the package accumulates on the downstream conveyor. Therefore, in order to prevent accumulation of the package, the conveyance speed V23 of the third side-alignment conveyor 46 on the downstream side is preferably higher than the conveyance speed V21 of the first side-alignment conveyor 42 on the upstream side. That is, the conveyance speed of the third side-alignment conveyor 46 is higher than the conveyance speed of the first side-alignment conveyor 42.

The conveyance speed of the auxiliary conveyance portion 56a of the third wall portion 56 is variable, and has a conveyance speed different from the conveyance speed of the third side-alignment conveyor 46. The conveyance surface 56b of the endless belt of the auxiliary conveyance portion 56a operates to move the processing targets S from the upstream side to the downstream side, parallel to the third direction of extension D23. In order to densely arrange the processing targets S conveyed by the second side-alignment conveyor 42, the third side-alignment conveyor 46 operates to move the processing targets S such that the conveyance speed of the auxiliary conveyance portion 56a is half the conveyance speed of the third side-alignment conveyor 46. That is, the conveyance speed of the auxiliary conveyance portion 56a is lower than the conveyance speed of the third side-alignment conveyor 46.

Next, the third conveyance portion 18 will be described. The third conveyance portion 18 includes a narrow conveyor 62, a speed-regulating conveyor 64, and a recovery portion 66. In the third conveyance portion 18, for example, a camera (sensor) (not illustrated) for recognizing the speed of the conveyance path 62a of the narrow conveyor 62 and the distance of the processing targets S before and after the conveyance path 62a is installed.

The narrow conveyor 62 is adjacent to the downstream side of the third side-alignment conveyor 46 along the X axis. The upstream end of the narrow conveyor 62 is formed to have a width smaller than the width in the width direction orthogonal to the direction of extension D23 of the downstream end of the third side-alignment conveyor 46. The width of the narrow conveyor 62 is set according to the sizes of the processing targets S, for example. The narrow conveyor 62 has a width that does not allow a plurality of processing targets S of an appropriate size to be arranged in the width direction. The narrow conveyor 62 includes the conveyance path 62a which is horizontal to the horizontal plane (ground) formed of, for example, an endless belt. The upstream end of the conveyance path 62a of the narrow conveyor 62 is arranged in a position adjacent to the downstream end in one direction in the width direction of the conveyance path 46a of the third side-alignment conveyor 46. The conveyance direction C31 of the narrow conveyor 62 is parallel to the direction of extension D31 of the narrow conveyor 62. The conveyance speed V31 along the conveyance direction C31 of the conveyance path 62a of the narrow conveyor 62 is preferably higher than the conveyance speed V23 along the conveyance direction C23 of the conveyance path 46a of the third side-alignment conveyor 46.

A fourth wall portion 68 serving as a wall that prevents the processing targets S from falling off from one direction of the narrow conveyor 62 is provided at an end (outside end) 62b in one direction in the width direction orthogonal to the direction of extension D31 (conveyance direction C31) of the narrow conveyor 62. The fourth wall portion 68 extends, for example, parallel to the direction of extension D31 of the conveyance path 62a of the narrow conveyor 62. Due to the presence of the fourth wall portion 68, the processing targets S are prevented from falling off from the narrow conveyor 62.

Note that the end (outside end) 62b of the narrow conveyor 62 and the end (outside end) 46b of the third side-alignment conveyor 46 are preferably on a straight line along the X axis.

The fourth wall portion 68 includes an auxiliary conveyance portion 68a that actively or passively conveys the processing targets S along the direction of extension D31 from the upstream side toward the downstream side of the conveyance path 62a of the narrow conveyor 62. The auxiliary conveyance portion 68a of the fourth wall portion 68 is oriented toward the other end (inside end) 62c in the width direction orthogonal to the direction of extension D31 of the narrow conveyor 62.

Here, a case where the auxiliary conveyance portion 68a of the fourth wall portion 68 actively conveys the processing targets S along the fourth direction of extension D31 from the upstream side toward the downstream side of the conveyance path 62a of the narrow conveyor 62 will be described as an example.

The auxiliary conveyance portion 68a is formed similarly to the auxiliary conveyance portions 52a, 54a, 56a, for example. Therefore, the conveyance surface 68b of the endless belt of the auxiliary conveyance portion 68a moves the processing targets S from the upstream side to the downstream side at a conveyance speed V31, for example, parallel to the direction of extension D31.

Note that a horizontal component of the first conveyance path 14a, which is in the conveyance direction C1, and a horizontal component of the third conveyance path 18a, which is in the conveyance direction C32, are each straight.

The speed-regulating conveyor 64 is adjacent to the downstream side of the narrow conveyor 62 along the X axis. The conveyance path 64a of the speed-regulating conveyor 64 is appropriately controlled to accelerate/decelerate relative to the conveyance speed of the conveyance path 62a of the narrow conveyor 62 so that the processing targets S placed on the conveyance path 64a are separated from each other at a predetermined pitch.

The upstream end of the speed-regulating conveyor 64 is formed to have substantially the same width as the width in the width direction orthogonal to the direction of extension D31 of the downstream end of the narrow conveyor 62. The conveyance path 64a of the speed-regulating conveyor 64 is horizontal to the horizontal plane (ground) formed of, for example, an endless belt. The conveyance direction C32 of the speed-regulating conveyor 64 is parallel to the direction of extension D32 of the speed-regulating conveyor 64. The conveyance speed V32 along the conveyance direction C32 of the conveyance path 64a of the speed-regulating conveyor 64 is controlled so as to separate the pitch between the processing targets S arranged in one line to establish a predetermined pitch. Therefore, the conveyance speed V32 along the conveyance direction C32 of the conveyance path 64a of the speed-regulating conveyor 64 can be increased and decreased.

A fifth wall portion 70 serving as a wall that prevents the processing targets S from falling off from one direction of the speed-regulating conveyor 64 is provided at an end (outside end) 64b in one direction in the width direction orthogonal to the direction of extension D32 (conveyance direction C32) of the speed-regulating conveyor 64. The fifth wall portion 70 extends, for example, parallel to the direction of extension D32 of the conveyance path 64a of the speed-regulating conveyor 64. Due to the presence of the fifth wall portion 70, the processing targets S are prevented from falling off from the speed-regulating conveyor 64.

Note that the end (outside end) 64b of the speed-regulating conveyor 64 and the end (outside end) 62b of the narrow conveyor 62 are preferably on a straight line along the X axis.

The fifth wall portion 70 includes an auxiliary conveyance portion 70a that actively or passively conveys the processing targets S along the direction of extension D32 from the upstream side toward the downstream side of the conveyance path 64a of the speed-regulating conveyor 64. The auxiliary conveyance portion 70a of the fifth wall portion 70 is oriented toward the other end (inside end) 64c in the width direction orthogonal to the direction of extension D32 of the speed-regulating conveyor 64.

For example, the auxiliary conveyance portion 70a may be formed as a conveyance surface that actively conveys the processing targets S similarly to the conveyance surfaces 52b, 54b, 56b, and 68b of the auxiliary conveyance portions 52a, 54a, 56a, and 68a. Here, the auxiliary conveyance portion 70a includes a plurality of rollers 70b that passively rotate upon contact with the processing targets S. The rollers 70b in FIG. 3 are arranged, for example, in a lattice pattern or in one line. The rollers 70b are each formed in a spherical shape and are freely rotatable in these positions.

Note that the rollers 70b may also be formed so as to rotate about axes parallel to the Z axis, like rollers (wheels) of a roller conveyor.

The recovery portion 66 is adjacent to the downstream end along the X axis of the conveyance path 46a of the third side-alignment conveyor 46 of the second conveyance portion 16 and is adjacent to the other direction (inside) in the width direction of the narrow conveyor 62. The recovery portion 66 includes an inclined surface 72 and a guide 74.

The inclined surface 72 is formed as a flat surface or a curved surface. The inclined surface 72 is higher in a position (first end 72a) closer to the narrow conveyor 62, and is lower in a position (second end 72b) closer to the other side in the width direction orthogonal to the horizontal component of the first conveyance portion 14 which is in the conveyance direction C1. The inclined surface 72 is higher in a position (third end 72c) closer to the downstream end of the conveyance path 46a of the third side-alignment conveyor 46, and is lower in a position (fourth end 72d) away from the downstream end of the conveyance path 46a of the third side-alignment conveyor 46 along the X-axis direction. The processing targets S placed on the inclined surface 72 slide toward the fourth end 72d of the inclined surface 72 under their own weight.

The first end 72a of the inclined surface 72 on the narrow conveyor 62 side may be continuous with the downstream end of the conveyance path 62a of the narrow conveyor 62, or may be positioned, with a step, below the downstream end of the conveyance path 62a of the narrow conveyor 62.

The guide 74 is formed in a plate shape. The guide 74 is fixed to the second end 72b of the inclined surface 72. The guide 74 extends along the X-axis direction. The guide 74 is formed so as to protrude upward from the second end 72b (an end close to the other side in the width direction orthogonal to the horizontal component of the first conveyance portion 14 which is in the conveyance direction C1) of the inclined surface 72.

As illustrated in FIGS. 1 and 2, the supply apparatus 10 includes a fourth conveyance portion 20 that is adjacent to the recovery portion 66 that recovers the processing targets S in the third conveyance portion 18 and that conveys the processing targets S recovered by the recovery portion 66, toward the feeder 12.

The fourth conveyance portion 20 includes, for example, a curve conveyor 92. The curve conveyor 92 is provided between the fourth end 72d of the inclined surface 72 of the recovery portion 66, and the feeder 12.

The upstream end of a conveyance path 92a of the curve conveyor 92 is adjacent to the fourth end 72d of the inclined surface 72. The downstream end of the conveyance path 92a of the curve conveyor 92 is adjacent to the feeder 12.

Note that the lengths along the directions of extension D21, D22, and D23 of the first side-alignment conveyor 42, the second side-alignment conveyor 44, and the third side-alignment conveyor 46 of the second conveyance portion 16, the widths orthogonal to the directions of extension D21, D22, and D23, and the angles θa, θb, and θc are set such that, for example, when the processing targets S at the inside end 42c of the downstream end of the conveyance path 42a of the first side-alignment conveyor 42 pass through the first side-alignment conveyor 42, the second side-alignment conveyor 44, and the third side-alignment conveyor 46 as described subsequently, the processing targets S make contact with the outside end 46b of the third side-alignment conveyor 46.

Next, the operation of the supply apparatus 10 will be described.

In the present embodiment, the conveyance speed of the first conveyance portion 14 along the conveyance direction C1 (C10, C11, C12) matches the movement speed of the processing targets S in contact with the first conveyance portion 14. Similarly, it is assumed that the conveyance speed of the second conveyance portion 16 along the conveyance directions C21, C22, and C23 matches the movement speed of the processing targets S in contact with the second conveyance portion 16 in a state where the processing targets S do not make contact with the wall portions 52, 54, and 56. It is assumed that the conveyance speed of the third conveyance portion 18 along the conveyance directions C31, C32 matches the conveyance speed of the processing targets S in contact with the third conveyance portion 18 in a state where the processing targets S do not make contact with the wall portions 68, 70.

For example, the tipper is inclined, and the processing targets S are fed into the feeder 12. Instead of the tipper or together with the tipper, a worker may feed the processing targets S into the feeder 12.

The processing targets S, which may be in a multi-layered, bulk-loaded state in the feeder 12, sequentially move toward the upstream end of the conveyance path 22a of the first conveyor portion 22 of the first conveyance portion 14 due to, for example, inclination of the floor surface of the feeder 12.

At this time, the first conveyor portion 22 of the first conveyance portion 14 removes the processing targets S in contact with the conveyance path 22a through the conveyance operation of the conveyance path 22a, and separates and spreads the plurality of processing targets S while moving the processing targets S in the conveyance direction C10. The processing targets S in contact with the conveyance path 22a of the first conveyor portion 22 are conveyed from the upstream side toward the downstream side. In accordance with the conveyance operation of the conveyance path 22a of the first conveyor portion 22, other processing targets S overlaid on the upper side of the processing targets S slide with respect to the lower processing targets S in accordance with a frictional force against the lower processing targets S. Therefore, some of the multi-layered processing targets S collapse. Thus, for example, some of the multi-layered processing targets S are separated and scattered.

The processing targets S are delivered from the conveyance path 22a of the first conveyor portion 22 to the conveyance path 32a of the first inclined conveyor 32 of the second conveyor portion 24.

The conveyance path 32a of the first inclined conveyor 32 is inclined as a downward slope. A horizontally inclined component parallel to the upper surfaces of the processing targets S acts on the processing targets S placed on the upper side of the processing targets S which have, for example, a rectangular parallelepiped shape that makes contact with the conveyance path 32a of the first inclined conveyor 32. For this reason, the other processing targets S overlaid on the upper side of the processing targets S in contact with the conveyance path 32a slide more readily with respect to the processing targets S in contact with the conveyance path 32a than when the other processing targets S are horizontal as in the case of the conveyance path 22a of the first conveyor portion 22.

The conveyance speed V11 of the conveyance path 32a of the first inclined conveyor 32 is lower than the conveyance speed V10 of the conveyance path 22a of the first conveyor portion 22. Therefore, due to the conveyance speed difference between the horizontal conveyance path 22a of the first conveyor portion 22 and the conveyance path 32a of the first inclined conveyor 32, the processing targets S in contact with the conveyance path 32a have undergone braking, and the processing targets S on the upper side of the processing targets S in contact with the conveyance path 32a slide with respect to the processing targets S in contact with the conveyance path 32a according to the law of inertia, and the multi-layered processing targets S collapse.

Therefore, the multi-layered processing targets S collapse in the first inclined conveyor 32 due to the inclined surface, which is the downward-sloping conveyance path 32a, and the law of inertia. For this reason, for example, some of the multi-layered processing targets S are separated and scattered.

Note that, depending on the shape and the like of the processing targets S in contact with the conveyance path 32a of the first inclined conveyor 32, the processing targets S in contact with the conveyance path 32a of the first inclined conveyor 32 roll, and the processing targets S having a plurality of layers, such as two layers, collapse.

Some of the processing targets S are delivered from the conveyance path 32a of the first inclined conveyor 32 of the second conveyor portion 24 to the conveyance path 34a of the second inclined conveyor 34 of the second conveyor portion 24 in a state of a plurality of layers, for example.

The conveyance path 34a of the second inclined conveyor 34 is inclined as an upward incline. For this reason, the other processing targets S overlaid on the upper side of the processing targets S in contact with the conveyance path 34a slide more readily with respect to the processing targets S in contact with the conveyance path 34a than when the other processing targets S are horizontal as in the case of the conveyance path 22a of the first conveyor portion 22.

The conveyance speed V12 of the conveyance path 34a of the second inclined conveyor 34 is higher than the conveyance speed V11 of the conveyance path 32a of the first inclined conveyor 32. Therefore, due to the conveyance speed difference between the conveyance path 32a of the first inclined conveyor 32 and the conveyance path 34a of the second inclined conveyor 34, the processing targets S in contact with the conveyance path 34a enter an accelerated state, and the processing targets S on the upper side of the processing targets S in contact with the conveyance path 34a slide with respect to the processing targets S in contact with the conveyance path 34a according to the law of inertia, and the multi-layered processing targets S collapse.

Therefore, the multi-layered processing targets S collapse further in the second inclined conveyor 34 due to the inclined surface, which is the upward slanting conveyance path 34a, and the law of inertia. For this reason, for example, some of the multi-layered processing targets S are separated and scattered.

In this manner, the multi-layered processing targets S collapse due to the first conveyor portion 22 and the second conveyor portion 24 and are separated one by one. These multi-layered processing targets S may be components of the same type or components of different types.

The processing targets S are then delivered from the second inclined conveyor 34 to the first side-alignment conveyor 42. Due to the step H between the second inclined conveyor 34 and the first side-alignment conveyor 42, when the processing targets S are delivered from the second inclined conveyor 34 to the first side-alignment conveyor 42, the processing targets S move significantly. At this time, the processing targets S are separated as a result of the processing targets being pulled so as to be removed along the conveyance direction C21 by the first side-alignment conveyor 42 on the downstream side of the second inclined conveyor 34.

Note that, in FIG. 3, an example is illustrated in which the step H is provided between the second inclined conveyor 34 and the first side-alignment conveyor 42. For example, a conveyor having a horizontal conveyance path may be arranged between the second inclined conveyor 34 and the first side-alignment conveyor 42, and the step H may be between the conveyor having the horizontal conveyance path, and the first side-alignment conveyor 42.

The processing targets S separated one by one move in the conveyance direction C21 inclined with respect to the direction of extension D21 of the first side-alignment conveyor 42 from the upstream side toward the downstream side, on the conveyance path 42a of the first side-alignment conveyor 42. Therefore, the plurality of processing targets S are brought toward the first wall portion 52 on the conveyance path 42a of the first side-alignment conveyor 42. For this reason, the distances in the width direction of the plurality of processing targets S gradually decrease from the upstream side toward the downstream side. Some of the processing targets S then abut against the first wall portion 52 between the upstream end and the downstream end of the conveyance path 42a of the first side-alignment conveyor 42.

The processing targets S abutting against the first wall portion 52 on the conveyance path 42a of the first side-alignment conveyor 42 move in a conveyance direction along the direction of extension D21 of the conveyance path 42a at a speed of V21·cos θa. The processing targets S move along the first wall portion 52 and are delivered from the conveyance path 42a of the first side-alignment conveyor 42 to the conveyance path 44a of the second side-alignment conveyor 44. Thus, the auxiliary conveyance portion 52a of the first wall portion 52 prevents the first wall portion 52 from hindering the movement of the processing targets S when the processing targets S make contact with the first wall portion 52.

The processing targets S move in the conveyance direction C22 inclined with respect to the direction of extension D22 of the second side-alignment conveyor 44 from the upstream side toward the downstream side, on the conveyance path 44a of the second side-alignment conveyor 44. At this time, the conveyance direction of the processing targets S changes from the direction along the direction of extension D21 or the direction along the conveyance direction C21 to the direction along the conveyance direction C22. Therefore, the plurality of processing targets S are brought toward the second wall portion 54 on the conveyance path 44a of the second side-alignment conveyor 44. For this reason, the distances in the width direction of the plurality of processing targets S gradually decrease. Some of the processing targets S then abut against the second wall portion 54 between the upstream end and the downstream end of the conveyance path 44a of the second side-alignment conveyor 44. Therefore, the plurality of processing targets S approaches a state of one line.

The processing targets S abutting against the second wall portion 54 on the conveyance path 44a of the second side-alignment conveyor 44 move in a conveyance direction along the direction of extension D22 of the conveyance path 44a at a speed of V22·cos θb. The processing targets S move along the second wall portion 54 and are delivered from the conveyance path 44a of the second side-alignment conveyor 44 to the conveyance path 46a of the third side-alignment conveyor 46. Thus, the auxiliary conveyance portion 54a of the second wall portion 54 prevents the second wall portion 54 from hindering the movement of the processing targets S when the processing targets S make contact with the second wall portion 54.

The processing targets S move in the conveyance direction C23 inclined with respect to the direction of extension D23 of the third side-alignment conveyor 46 from the upstream side toward the downstream side, on the conveyance path 46a of the third side-alignment conveyor 46. At this time, the conveyance direction of the processing targets S changes from the direction along the direction of extension D22 or the direction along the conveyance direction C22 to the direction along the conveyance direction C23. Therefore, the plurality of processing targets S are brought toward the third wall portion 56 on the conveyance path 46a of the third side-alignment conveyor 46. For this reason, the distances in the width direction of the plurality of processing targets S gradually decrease. Some of the processing targets S then abut against the third wall portion 56 between the upstream end and the downstream end of the conveyance path 46a of the third side-alignment conveyor 46. The plurality of processing targets S form one line.

As described above, the plurality of processing targets S conveyed along the center in the width direction of the conveyance path 14a of the first conveyance portion 14 move through the conveyance path 42a of the first side-alignment conveyor 42, the conveyance path 44a of the second side-alignment conveyor 44, and the conveyance path 46a of the third side-alignment conveyor 46, that is, the laterally aligned states orthogonal to the directions of extension D21, D22, and D23 are gradually eliminated as the direction is changed. The plurality of processing targets S are then arranged in one line, for example, on the conveyance path 46a of the third side-alignment conveyor 46. In this manner, the second conveyance portion 16 arranges the plurality of processing targets S into one line while side-aligning, as a whole, the plurality of processing targets S in one direction in the width direction orthogonal to the directions of extension D21, D22, and D23 of the U-shaped second conveyance path 16a.

The processing targets S abutting against the third wall portion 56 on the conveyance path 46a of the third side-alignment conveyor 46 move in a conveyance direction along the direction of extension D23 of the conveyance path 46a at a speed of V23·cos θc. The processing targets S move along the third wall portion 56 and are delivered from the conveyance path 46a of the third side-alignment conveyor 46 to the conveyance path 62a of the narrow conveyor 62. Thus, the auxiliary conveyance portion 56a of the third wall portion 56 prevents the third wall portion 56 from hindering the movement of the processing targets S when the processing targets S make contact with the third wall portion 56.

The conveyance speed V31 of the conveyance path 62a of the narrow conveyor 62 is higher than V23·cos θc. Therefore, when the processing targets S are delivered from the conveyance path 46a of the third side-alignment conveyor 46 to the conveyance path 62a of the narrow conveyor 62, the conveyance path 62a of the narrow conveyor 62 widens the pitch of the plurality of processing targets S arranged in one line.

The processing targets S abutting against the fourth wall portion 68 on the conveyance path 62a of the narrow conveyor 62 move in a direction along a predetermined conveyance direction C31 (direction of extension D31) of the conveyance path 62a at a speed of V31. The processing targets S move along the fourth wall portion 68 and are delivered from the conveyance path 62a of the narrow conveyor 62 to the conveyance path 62a of the narrow conveyor 62. Thus, the auxiliary conveyance portion 68a of the fourth wall portion 68 prevents the fourth wall portion 68 from hindering the movement of the processing targets S when the processing targets S make contact with the fourth wall portion 68.

When the processing targets S are delivered from the conveyance path 62a of the narrow conveyor 62 of the third conveyance portion 18 to the conveyance path 64a of the speed-regulating conveyor 64 of the third conveyance portion 18, the conveyance speed V32 of the conveyance path 64a of the speed-regulating conveyor 64 of the third conveyance portion 18 is appropriately controlled based on, for example, information on the preceding and subsequent processing targets S on the conveyance path 62a recognized by the camera. That is, acceleration and deceleration of the conveyance speed V32 along the predetermined conveyance direction C32 (direction of extension D32) of the conveyance path 64a of the speed-regulating conveyor 64 of the third conveyance portion 18 are controlled, and the processing targets S arranged in one line are separated at a predetermined pitch on the conveyance path 64a of the speed-regulating conveyor 64 of the third conveyance portion 18.

The processing targets S separated by a predetermined pitch and arranged in one line are fed into the package feeder 112 of the distribution sorter 110 of the distribution system on the downstream side of the third conveyance portion 18. Alternatively, the processing targets S arranged in one line at a predetermined pitch are fed into the component feeder of the manufacturing line on the downstream side of the third conveyance portion 18.

When the processing targets S are abutting against the rollers 70b of the auxiliary conveyance portion 70a, the rollers 70b of the auxiliary conveyance portion 70a rotate in that position, and move the processing targets S from the upstream side to the downstream side at the conveyance speed V32 of the conveyance path 64a of the speed-regulating conveyor 64 of the third conveyance portion 18, parallel to the direction of extension D32. Thus, in the auxiliary conveyance portion 70a of the fifth wall portion 70, the friction between the fifth wall portion 70 and the processing targets S prevents the movement of the processing targets S from being hindered.

There is a possibility that the plurality of processing targets S are not arranged in one line on the conveyance path 46a of the third side-alignment conveyor 46, and are arranged in the width direction orthogonal to the direction of extension D23 of the third side-alignment conveyor 46, on the conveyance path 46a of the third side-alignment conveyor 46. On the conveyance path 46a of the third side-alignment conveyor 46, among the processing targets S not arranged in one line, those processing targets S which have been separated in the width direction from the third wall portion 56 are not conveyed from the downstream end of the conveyance path 46a of the third side-alignment conveyor 46 to the conveyance path 62a of the narrow conveyor 62 and are delivered to the inclined surface 72 of the fourth conveyance portion 20. Therefore, the processing targets S reach the fourth end 72d of the inclined surface 72 while sliding near the boundary between the inclined surface 72 and the guide 74.

The processing targets S that have reached the fourth end 72d of the inclined surface 72 are conveyed to the feeder 12 by the curve conveyor 92. Thus, the recovery portion 66 and the fourth conveyance portion 20 convey, among the processing targets S, those processing targets S which have failed to be aligned in one direction in the second conveyance portion 16, toward the first conveyance portion 14. Therefore, the recovery portion 66 is configured to recover some of the processing targets S aligned in one direction in the second conveyance portion 16, among the processing targets S. Therefore, the processing targets S which have been recovered by the recovery portion 66 and conveyed from the fourth conveyance portion 20 to the feeder 12 are once again arranged at a predetermined pitch with respect to other processing targets S by passing, from the feeder 12, through the first conveyance portion 14, the second conveyance portion 16, and the third conveyance portion 18, and are fed into the package feeder 112 of the distribution sorter 110 of the distribution system or into the component feeder of the manufacturing line.

Thus, the first conveyance portion 14 of the supply apparatus 10 according to the present embodiment is used as a separation stage that separates, one by one, the plurality of bulk-loaded processing targets S. The second conveyance portion 16 is used as an arrangement stage for arranging, into one line, the processing targets S that have been separated one by one. The third conveyance portion 18 is used as an adjustment stage that separates the processing targets S that have been arranged in one line, at a predetermined pitch. Further, the supply apparatus 10 according to the present embodiment is configured to convey the plurality of processing targets S to the first conveyance portion (separation stage) 14, the second conveyance portion (arrangement stage) 16, and the third conveyance portion (adjustment stage) 18 in that order and of delivering the plurality of processing targets S to another apparatus.

At this time, regardless of whether the processing targets S are of the same kind or of different kinds, when, for example, many kinds of processing targets S are fed into the feeder 12 at the same time, the processing targets S can be fed into the package feeder 112 of the distribution sorter 110 or into the component feeder of the manufacturing line in a state where the processing targets S have been separated in the first conveyance portion 14, the processing targets S have been arranged in a line in the second conveyance portion 16, and the processing targets S have been separated at a predetermined pitch in the third conveyance portion 18.

Therefore, the processing targets S which have been fed into the feeder 12 can be automatically separated by the supply apparatus 10 using the first conveyance portion 14, the second conveyance portion 16, and the third conveyance portion 18, and can be arranged in one line and spaced at a predetermined pitch. The processing targets S can then be delivered from the supply apparatus 10 to a later-stage apparatus.

In the first conveyance portion 14, the bulk-loaded processing targets S can be separated one by one using a plurality of conveyance portions such as the first conveyor portion 22 and the first inclined conveyor 32 and the second inclined conveyor 34 of the second conveyor portion 24. Therefore, in the second conveyance portion 16, it is possible to avoid a state in which the processing targets S have multiple layers. For this reason, the plurality of processing targets S are readily arranged in one line.

Note that the supply apparatus 10 according to the present embodiment feeds processing targets S having different sizes, materials, and shapes into the first conveyance portion 14 regardless of whether the processing targets S are of different types or of the same type, thus enabling the processing targets S to be separated at a predetermined pitch and delivered to another apparatus. By appropriately forming the conveyance path 16a of the second conveyance portion 16, the supply apparatus 10 according to the present embodiment is configured to handle relatively small processing targets S such as bolts or nuts, processing targets S which are larger than bolts or nuts such as beverage bottles, and relatively large processing targets S such as home delivery items.

In the present embodiment, due to the step H between the second inclined conveyor 34 and the first side-alignment conveyor 42, the processing targets S are moved significantly when being delivered from the second inclined conveyor 34 to the first side-alignment conveyor 42. For this reason, the processing targets S can be separated as a result of the processing targets being pulled so as to be removed along the conveyance direction C21 by the first side-alignment conveyor 42 on the downstream side of the second inclined conveyor 34.

In the supply apparatus 10 according to the present embodiment, for example, the conveyance speed V21 of the conveyance path 42a of the first side-alignment conveyor 42 of the second conveyance portion 16 is increased with respect to the conveyance speed V12 of the conveyance path 32a of the second inclined conveyor 34 of the first conveyance portion 14; the conveyance speed V22 of the conveyance path 44a of the second side-alignment conveyor 44 is increased with respect to the conveyance speed V21 of the conveyance path 42a of the first side-alignment conveyor 42; the conveyance speed V23 of the conveyance path 46a of the third side-alignment conveyor 46 is increased with respect to the conveyance speed V22 of the conveyance path 44a of the second side-alignment conveyor 44; and the conveyance speed V31 of the conveyance path 62a of the narrow conveyor 62 is increased with respect to the conveyance speed V23 of the conveyance path 46a of the third side-alignment conveyor 46. In this case, at the time of delivery of the conveyance paths 32a, 42a, 44a, 46a, and 62a, the distance between the processing targets S along the conveyance direction due to the speed difference can be taken. Therefore, the processing targets S can be prevented from staying on the conveyance path 16a of the second conveyance portion 16, and the processing targets S can be separated. Therefore, the processing targets S are prevented from interfering with each other, and the processing targets S are readily arranged in one line on the conveyance path 46a.

In addition, the supply apparatus 10 according to the present embodiment includes a plurality of conveyors 42, 44, and 46 for which the directions of extension D21, D22, and D23 of the second conveyance portion 16 are U-shaped overall. The directions of extension D21, D22, and D23 of the plurality of conveyors 42, 44, and 46 are straight, for example. Therefore, it is possible to suppress an increase in costs in comparison with a case where the conveyors 42, 44, and 46 are integrally formed according to the space.

Because the directions of extension D21, D22, and D23 of the second conveyance portion 16 are U-shaped overall, it is easy to arrange the first conveyance portion 14 on the upstream side of the second conveyance portion 16 and the third conveyance portion 18 on the downstream side of the second conveyance portion 16 in a state of facing each other in the Y-axis direction. In addition, the horizontal components of the first conveyance portion 14, which are in the directions of extension D10, D11, and D12, can be made parallel to the direction of extension D31 of the narrow conveyor 62 and the direction of extension D32 of the speed-regulating conveyor 64, of the third conveyance portion 18. Therefore, the supply apparatus 10 according to the present embodiment can be arranged in a space-saving manner. By appropriately setting the angles θ1 and θ2 and the angles θa, θb, and θc and appropriately setting the lengths and widths of the conveyance portions 14, 16, and 18, the supply apparatus 10 can be formed according to the installation space. For example, by appropriately setting the lengths of the directions of extension D21, D22, and D23 of the plurality of conveyors 42, 44, and 46, the widths orthogonal to the directions of extension D21, D22, and D23 and the inclination angles θa, θb, and θc of the conveyors 42, 44, and 46, the size, shape, and the like of the second conveyance portion 16 can be appropriately set.

In the present embodiment, the narrow conveyor 62 of the third conveyance portion 18 has been described as using an endless belt. For example, ball rollers arranged in a grid may be used. In this case, for example, the processing targets S placed on the narrow conveyor 62 can be pushed out from the wall portion 68 to the recovery portion 66. Therefore, the recovery portion 66 is configured to recover some of the processing targets S aligned in one direction in the second conveyance portion 16, among the processing targets S. For example, the supply apparatus 10 is configured to selectively convey processing targets S of the same type or processing targets S of the same size to the third conveyance portion 18.

In the present embodiment, the third conveyance portion 18 has been described as having the narrow conveyor 62. Instead of the narrow conveyor 62, a roller conveyor (not illustrated) having a width substantially equal to that of the third side-alignment conveyor 46 and extending in a direction of extension parallel to the direction of extension D32 like the third conveyance portion 18, for example, may be used. In this case, for example, a gate may be provided between the terminal end of the third side-alignment conveyor 46 and the roller conveyor arranged on the downstream side of the third side-alignment conveyor 46. Sorting can be performed to determine whether or not to convey the processing targets S to the third conveyance portion 18 by opening and closing the gate or by detecting processing targets S at the gate.

The gate may be provided on the conveyance path 64a of the speed-regulating conveyor 64 of the third conveyance portion 18. When the conveyance speed of the conveyance path 64a of the speed-regulating conveyor 64 of the third conveyance portion 18 is set to a constant speed, the timing for passing through the gate can be adjusted by opening and closing the gate, and the interval between the processing targets S can be separated by a predetermined distance.

In the present embodiment, the third conveyance portion 18 has been described as having the narrow conveyor 62. Instead of the narrow conveyor 62, the processing targets S may be delivered from the third side-alignment conveyor 46 to the speed-regulating conveyor 64 of the third conveyance portion 18 through adsorption by a robot arm, for example. In this case also, sorting can be performed to determine whether or not to convey processing targets S to the third conveyance portion 18 by detecting the processing targets S using a sensor attached to the robot arm.

A robot arm may be used instead of the conveyance path 18a of the third conveyance portion 18. The third conveyance portion 18 may be a robot. The processing targets S conveyed to the downstream end of the third side-alignment conveyor 46 of the second conveyance portion 16, for example, may be directly fed by the robot arm into the package feeder 112 of the distribution sorter 110 of the distribution system or into the component feeder of the manufacturing line, for example.

As the recovery portion 66 of the third conveyance portion 18, instead of the inclined surface 72 and the guide 74, a collection container (not illustrated) for collecting processing targets S that are not arranged in a line in one direction may be installed, in the second conveyance portion 16, in a position adjacent to the narrow conveyor 62 of the third conveyance portion 18 at the downstream end of the third side-alignment conveyor 46 of the second conveyance portion 16. After the processing targets S are collected for an appropriate time in the collection container serving as the recovery portion 66, the collection container may be moved to refeed each processing target S into the feeder 12. Therefore, the fourth conveyance portion 20 is not necessarily required.

The fourth conveyance portion 20 may use, for example, a straight conveyor or a vertical sorter instead of the curve conveyor 92. The position at the upstream end of the fourth conveyance portion 20 is a position adjacent to the speed-regulating conveyor 64 in FIG. 2. The position at the upstream end of the fourth conveyance portion 20 may be a position adjacent to the narrow conveyor 62.

In the above-described example, a case where the auxiliary conveyance portions 52a, 54a, 56a, and 68a in which the first wall portion 52, the second wall portion 54, the third wall portion 56, and the fourth wall portion 68 actively move are provided has been described. The fourth wall portion 68 may be configured to passively convey the processing targets S from the upstream side toward the downstream side. In a case where the first wall portion 52, the second wall portion 54, the third wall portion 56, and the fourth wall portion 68 passively convey the processing targets S from the upstream side to the downstream side, the configuration is preferably similar to that of the auxiliary conveyance portion 70a. All of the auxiliary conveyance portions 52a, 54a, 56a, 68a, and 70a may be configured to actively convey the processing targets S from the upstream side toward the downstream side.

As described hereinabove, according to the present embodiment, it is possible to provide a supply apparatus 10 that facilitates handling of processing targets S (packages) in a multi-layered, bulk-loaded state or the like by the distribution sorter 110 or a later-stage apparatus of a manufacturing line or the like, for example.

Second Embodiment

Next, a package supply apparatus (hereinafter, simply referred to as the supply apparatus) 10 according to a second embodiment will be described with reference to FIGS. 9 to 10. The present embodiment is different from the first embodiment in that the present embodiment includes sensors 301, 302 that measure the volume of the packages conveyed between the first side-alignment conveyor 42, the second side-alignment conveyor 44, and the third side-alignment conveyor 46, respectively. Note that configurations other than the configurations described below are like those of the first embodiment.

Figure 9:
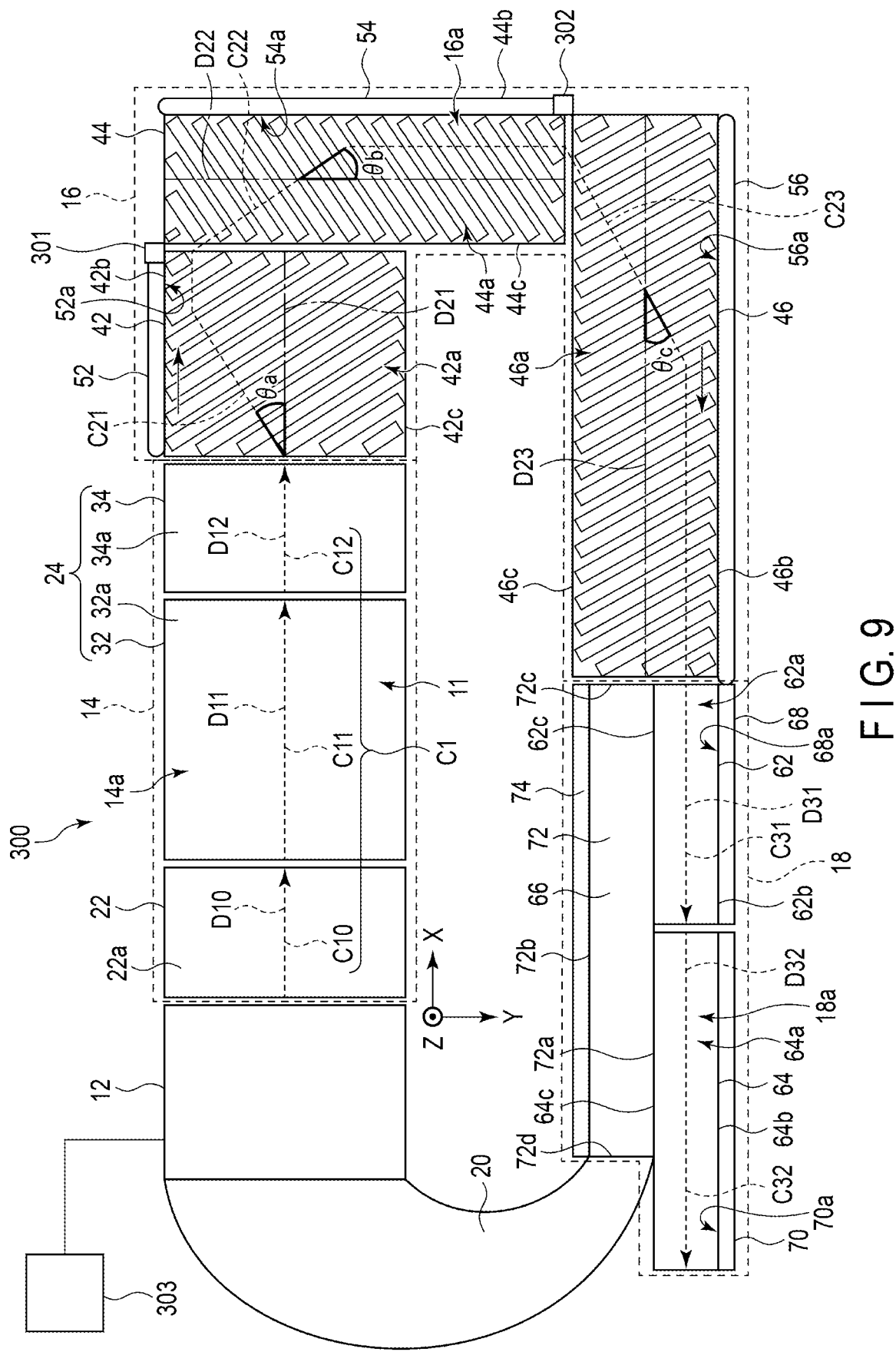
FIG. 9 is a schematic view illustrating a state in which a package supply apparatus according to a second embodiment is viewed from above.

FIG. 9 is a schematic view illustrating a state in which a supply apparatus 300 according to the second embodiment is viewed from above. The supply apparatus 300 according to the second embodiment includes a sensor 301, a sensor 302, and a control apparatus 303.

The sensor 301 is a sensor that is provided between the first side-alignment conveyor 42 and the second side-alignment conveyor 44 and measures the flow rate of the conveyed processing targets S, and detects the presence or absence of the processing targets S. For example, the sensor 301 is a laser range finder (LRF) that emits a laser from the sensor 301 in a direction orthogonal to the direction of extension D21 of the first side-alignment conveyor 42 and parallel to the direction of extension D22 of the second side-alignment conveyor 44.

The sensor 301 measures the distance from the sensor 301 to the processing targets S as a result of the processing targets S being irradiated with the laser emitted by the sensor 301 and the reflected light being received by the light-receiving unit. In a case where the processing targets S conveyed from the first side-alignment conveyor 42 to the second side-alignment conveyor 44 is present, the sensor 301 receives reflected light reflected by the conveyed processing targets S and thus determines that the processing targets S conveyed from the first side-alignment conveyor 42 to the second side-alignment conveyor 44 is present. In a case where the reflected light is not received, the sensor 301 determines that the processing targets S conveyed from the first side-alignment conveyor 42 to the second side-alignment conveyor 44 does not exist.

The sensor 302 is a sensor that is provided between the second side-alignment conveyor 44 and the third side-alignment conveyor 46 and measures the flow rate of the conveyed processing targets S, and detects the presence or absence of the processing targets S. For example, the sensor 302 is a laser range finder (LRF) that emits a laser from the sensor 302 in a direction orthogonal to the direction of extension D22 of the second side-alignment conveyor 44 and parallel to the direction of extension D23 of the third side-alignment conveyor 46.

The sensor 302 measures the distance from the sensor 302 to the processing targets S as a result of the processing targets S being irradiated with the laser emitted by the sensor 302 and the reflected light being received by the light-receiving unit. In a case where the processing targets S conveyed from the second side-alignment conveyor 44 to the third side-alignment conveyor 46 is present, the sensor 302 receives reflected light reflected by the conveyed processing targets S and thus determines that the processing targets S conveyed from the second side-alignment conveyor 44 to the third side-alignment conveyor 46 is present. In a case where the reflected light is not received, the sensor 302 determines that the processing targets S conveyed from the second side-alignment conveyor 44 to the third side-alignment conveyor 46 is not present.

Note that the sensor 301 and the sensor 302 may be cameras that capture images of the first side-alignment conveyor 42, the second side-alignment conveyor 44, and the third side-alignment conveyor 46 from above. The sensor 301 and the sensor 302 may be any sensor as long as the sensor can acquire the flow rate of the processing targets S conveyed by the second conveyance portion 16.

The control apparatus 303 is a computer that is connected to the second conveyance portion 16 by a wireless or wired network and that controls the second conveyance portion 16. Note that the control apparatus 303 may control the entire supply apparatus 300 including the first conveyance portion 14 and the third conveyance portion 18, or may control the entire article sorting apparatus. The control apparatus 303 that controls the second conveyance portion 16 included in the supply apparatus 300 will be described with reference to FIG. 10.

FIG. 10 is a block diagram illustrating an example of a configuration of a control apparatus 303 according to the second embodiment. The control apparatus 303 includes a processor 401 (controller), a ROM 402, a RAM 403, an auxiliary storage device 404 (storage unit), and a communication interface 405 (communication unit).

The processor 401 corresponds to a central part of a computer that performs processing such as computation and control necessary for processing by the control apparatus 303, and integrally controls the entire control apparatus 303. The processor 401 executes control to implement various functions of the control apparatus 303 based on a program such as system software, application software, or firmware which is stored in the ROM 402, the auxiliary storage device 404, or the like. The processor 401 is, for example, a central processing unit (CPU), a micro processing unit (MPU), or a digital signal processor (DSP). Alternatively, the processor 401 is a combination of a plurality of a CPU, an MPU, and a DSP.

The ROM 402 corresponds to a main storage apparatus of a computer the core of which is the processor 401. The ROM 402 is a nonvolatile memory exclusively used for reading data. The ROM 402 stores the program described above. In addition, the ROM 402 stores data, various setting values, or the like which are used when the processor 401 performs various processing.

The RAM 403 corresponds to a main storage apparatus of a computer the core of which is the processor 401. The RAM 403 is memory used to read and write data. The RAM 403 is used as a so-called work area or the like for storing data which is temporarily used when the processor 401 is performing various processing.

The auxiliary storage device 404 corresponds to an auxiliary storage device of a computer the core of which is the processor 401. The auxiliary storage device 404 is, for example, an electrically erasable programmable read-only memory (EEPROM) (registered trademark), a hard disk drive (HDD), or a solid state drive (SSD). The auxiliary storage device 404 sometimes also stores the program described above. In addition, the auxiliary storage device 404 stores data used when the processor 401 is performing various types of processing, data generated by processing by the processor 401, various setting values, and the like.

The program stored in the ROM 402 or the auxiliary storage device 404 includes a program for controlling the control apparatus 303. As an example, the control apparatus 303 is transferred to an administrator or the like of the control apparatus 303 in a state where the program is stored in the ROM 402 or the auxiliary storage device 404. However, the control apparatus 303 may be transferred to the administrator or the like in a state where the program is not stored in the ROM 402 or the auxiliary storage device 404. The program may then be separately transferred to the administrator or the like, and may be written to the auxiliary storage device 404 under an operation by the administrator or the service engineer. The transfer of the program at this time can be realized, for example, by recording the program on a removable storage medium such as a magnetic disk, a magneto-optical disk, an optical disk, or a semiconductor memory, or by downloading the program via a network or the like.

The communication interface 405 is an interface for communicating with another apparatus via a network or the like in a wired or wireless manner, receiving various types of information transmitted from the other apparatus, and transmitting various types of information to the other apparatus. The control apparatus 303 acquires the presence or absence of the processing targets S measured by the sensors 301 and 302 via the communication interface 405.

The processor 401 controls the conveyance speeds of the first side-alignment conveyor 42, the second side-alignment conveyor 44, and the third side-alignment conveyor 46. For example, the processor 401 acquires the flow rate of the processing targets S fed in from the feeder 12 via the communication interface 405, and controls, based on the flow rate, the conveyance speed of each of the first side-alignment conveyor 42, the second side-alignment conveyor 44, and the third side-alignment conveyor 46. In a case where the flow rate of the processing targets S fed in from the feeder 12 is greater than the predetermined threshold value, the processor 401 accelerates the conveyance speed of each of the first side-alignment conveyor 42, the second side-alignment conveyor 44, and the third side-alignment conveyor 46. In a case where the flow rate of the processing targets S fed in from the feeder 12 is less than the predetermined threshold value, the processor 401 decelerates the conveyance speed of each of the first side-alignment conveyor 42, the second side-alignment conveyor 44, and the third side-alignment conveyor 46. Thus, the processor 401 is configured to adjust the flow rate of the processing targets S conveyed downstream of the second conveyance portion 16.

In addition, the processor 401 acquires the presence or absence of the processing targets S from the sensor 301, and controls to decelerate the first side-alignment conveyor 42 on the upstream side of the sensor 301 in a case where the processing targets S is present, and controls to accelerate the conveyance speed of the first side-alignment conveyor 42 on the upstream side of the sensor 301 in a case where the processing targets S is not present. For example, the processor 401 determines the occurrence of accumulation at the time of transfer between the first side-alignment conveyor 42 and the second side-alignment conveyor 44 based on the presence or absence of the processing targets S acquired from the sensor 301. In a case where accumulation occurs at the time of transfer between the first side-alignment conveyor 42 and the second side-alignment conveyor 44, the processor 401 controls to decelerate the first side-alignment conveyor 42 so that there is no further accumulation of the processing targets S. In a case where accumulation at the time of transfer between the first side-alignment conveyor 42 and the second side-alignment conveyor 44 does not occur, the processor 401 controls to accelerate the first side-alignment conveyor 42 so as to increase the flow rate of the processing targets S.

In addition, the processor 401 acquires the presence or absence of the processing targets S from the sensor 302, and controls to decelerate the second side-alignment conveyor 44 on the upstream side of the sensor 302 in a case where the processing targets S is present, and controls to accelerate the conveyance speed of the second side-alignment conveyor 44 on the upstream side of the sensor 302 in a case where the processing targets S is not present. For example, the processor 401 determines the occurrence of accumulation at the time of transfer between the second side-alignment conveyor 44 and the third side-alignment conveyor 46 based on the presence or absence of the processing targets S acquired from the sensor 302. In a case where accumulation occurs at the time of transfer between the second side-alignment conveyor 44 and the third side-alignment conveyor 46, the processor 401 controls to decelerate the second side-alignment conveyor 44 so that there is no further accumulation of the processing targets S. In a case where the accumulation at the time of transfer between the second side-alignment conveyor 44 and the third side-alignment conveyor 46 does not occur, the processor 401 controls to accelerate the second side-alignment conveyor 44 so as to increase the flow rate of the processing targets S.

As a result, the processor 401 accelerates or decelerates the side-alignment conveyor on the upstream side based on the flow rate of the processing targets S generated at the time of transfer of the side-alignment conveyor, and thus the accumulation of the processing targets S can be reduced to efficiently convey the processing targets S.

The processor 401 controls conveyance speeds of the auxiliary conveyance portion 52a, the auxiliary conveyance portion 54a, and the auxiliary conveyance portion 56a. For example, the processor 401 controls the conveyance speeds of the auxiliary conveyance portion 52a, the auxiliary conveyance portion 54a, and the auxiliary conveyance portion 56a based on the control of the conveyance speeds of each of the first side-alignment conveyor 42, the second side-alignment conveyor 44, and the third side-alignment conveyor 46. For example, in the present embodiment, the conveyance speed of the auxiliary conveyance portion 52a is set to twice the conveyance speed of the first side-alignment conveyor 42. Therefore, in a case where the processor 401 controls to accelerate the conveyance speed of the first side-alignment conveyor 42, the processor controls to accelerate the conveyance speed of the auxiliary conveyance portion 52 so that the conveyance speed becomes twice the accelerated conveyance speed of the first side-alignment conveyor 42.

In addition, the processor 401 controls the conveyance speeds of the auxiliary conveyance portion 52a, the auxiliary conveyance portion 54a, and the auxiliary conveyance portion 56a to be decelerated or accelerated based on the flow rates acquired from the sensor 301 and the sensor 302. Similarly to the above, the processor 401 controls to increase or decrease the conveyance speed of the auxiliary conveyance portion 52, the auxiliary conveyance portion 54a, and the auxiliary conveyance portion 56a so as to be twice or half the conveyance speed of the accelerated or decelerated side-alignment conveyor in accordance with the acceleration or deceleration of the side-alignment conveyor on the upstream side based on the flow rate of the processing targets S generated at the time the side-alignment conveyor is transferred.

As a result, the processor 401 is configured to convey the processing targets S at a conveyance speed corresponding to the conveyance speed of the side-alignment conveyor by controlling the conveyance speed of the auxiliary conveyance portion.

As described above, the second conveyance portion 16 included in the supply apparatus 300 according to the present embodiment controls the conveyance speeds of the first side-alignment conveyor 42, the second side-alignment conveyor 44, the third side-alignment conveyor 46, the auxiliary conveyance portion 52a, the auxiliary conveyance portion 54a, and the auxiliary conveyance portion 56a. The second conveyance portion 16 includes a sensor 301 and a sensor 302 that acquire the flow rate of the processing targets S. The second conveyance portion 16 decelerates or accelerates the first side-alignment conveyor 42, the second side-alignment conveyor 44, the third side-alignment conveyor 46, the auxiliary conveyance portion 52a, the auxiliary conveyance portion 54a, and the auxiliary conveyance portion 56a based on the presence or absence of the processing targets S acquired from the sensors 301 and 302. In a case where the flow rate acquired from the sensor 301 and the sensor 302 is high, the second conveyance portion 16 decelerates the side-alignment conveyor upstream of the acquired sensor, and in a case where the flow rate is low, the second conveyance portion 16 accelerates the conveyance speed of the side-alignment conveyor upstream of the acquired sensor. Thus, the second conveyance portion 16 is configured to efficiently convey the processing targets S by adjusting the flow rate by increasing or decreasing the conveyance speed based on the flow rate of the processing targets S to be conveyed.

In the case of the supply apparatus according to at least one embodiment described hereinabove, the supply apparatus includes the first conveyance portion 14 that separates the processing targets S, the second conveyance portion 16 that arranges the processing targets S into a line, and the third conveyance portion 18 that is configured to convey the processing targets S while adjusting the interval therebetween, and thus it is possible to automatically separate and arrange the processing targets S in a multi-layered bulk-loaded state or the like, establish a predetermined pitch between the processing targets S, and facilitate handling thereof by a later-stage apparatus.

Moreover, in the case of the supply apparatus according to at least one embodiment described above, the supply apparatus includes the first conveyance portion 14 that removes the plurality of processing targets S from the feeder 12 on which the processing targets S are placed and conveys the processing targets S along the predetermined conveyance direction C1, the second conveyance portion 16 that is disposed on the downstream side of the first conveyance portion 14 and that conveys the processing targets S from the upstream side to the downstream side along the conveyance directions C21, C22, and C23, and the third conveyance portion 16 that is disposed on the downstream side of the second conveyance portion 16 and that is configured to convey the processing targets S while adjusting the interval between the processing targets S, and thus it is possible to automatically separate and arrange the processing targets S in a multi-layered bulk-loaded state or the like, establish a predetermined pitch between the processing targets S, and facilitate handling thereof by a later-stage apparatus.

While certain embodiments have been described, these embodiments have been presented by way of example only, and are not intended to limit the scope of the inventions. These novel embodiments may be embodied in various forms, and various omissions, replacements, and changes can be made thereon without departing from the spirit of the invention. The embodiments and their modifications are included in the scope and spirit of the invention and are included in the scope of the claimed inventions and their equivalents.

What is claimed is:

1. A package conveyance apparatus comprising:
   a first side-alignment conveyor configured to
      receive a plurality of packages conveyed in a state where the packages are irregularly arranged in a conveyance direction and a direction intersecting the conveyance direction,
      convey the packages in a first conveyance direction, and
      convey the packages while side-aligning the packages in a first direction;
   a first auxiliary conveyance belt
      provided on a side-alignment direction side of the first side-alignment conveyor,
      configured to apply a conveyance force to the packages in the first direction, and
      having a conveyance speed different from a conveyance speed of the first side-alignment conveyor;
   a second side-alignment conveyor configured to
      receive the packages conveyed by the first side-alignment conveyor,
      convey the packages in a second conveyance direction intersecting the first side-alignment conveyor, and
      convey the packages while side-aligning the packages in a second direction;
   a second auxiliary conveyance belt
      provided on a side-alignment direction side of the second side-alignment conveyor,
      configured to apply a conveyance force to the packages in the second direction, and
      having a conveyance speed different from a conveyance speed of the second side-alignment conveyor;
   a third side-alignment conveyor configured to
      receive the packages conveyed by the second side-alignment conveyor,
      convey the packages in a third conveyance direction intersecting the second side-alignment conveyor, and
      convey the packages while side-aligning the packages in a third direction; and
   a third auxiliary conveyance belt
      provided on a side-alignment direction side of the third side-alignment conveyor,
      configured to apply a conveyance force to the packages in the third direction, and
      having a conveyance speed different from a conveyance speed of the third side-alignment conveyor.

2. The package conveyance apparatus according to claim 1, wherein:
   the conveyance speed of the first auxiliary conveyance belt and the conveyance speed of the second auxiliary conveyance belt are set to be higher than the conveyance speed of the first side-alignment conveyor and the conveyance speed of the second side-alignment conveyor, respectively, and
   the conveyance speed of the third auxiliary conveyance belt is set to be lower than the conveyance speed of the third side-alignment conveyor.

3. The package conveyance apparatus according to claim 1, wherein:
   the conveyance speeds of the first auxiliary conveyance belt, the second auxiliary conveyance belt, and the third auxiliary conveyance belt are variable.

4. The package conveyance apparatus according to claim 1, wherein:
   the conveyance speed of the second side-alignment conveyor is higher than the conveyance speed of the first side-alignment conveyor.

5. The package conveyance apparatus according to claim 1, wherein:
   the conveyance speed of the second side-alignment conveyor is higher than the conveyance speed of the third side-alignment conveyor.

6. The package conveyance apparatus according to claim 5, wherein:
   the conveyance speed of the third side-alignment conveyor is higher than the conveyance speed of the first side-alignment conveyor.

7. The package conveyance apparatus according to claim 1, comprising:
   a sensor configured to measure a flow rate of packages to be conveyed, the sensor being provided between the first side-alignment conveyor and the second side-alignment conveyor, and between the second side-alignment conveyor and the third side-alignment conveyor; and
   a controller configured to control the conveyance speeds of the first side-alignment conveyor, the second side-alignment conveyor, and the third side-alignment conveyor,
   wherein the controller is configured to
      acquire the flow rate from the sensor,
      decelerate the side-alignment conveyor upstream of the sensor, in a case where the flow rate is high, and
      accelerate the conveyance speed of the side-alignment conveyor upstream of the sensor, in a case where the flow rate is low.

8. The package conveyance apparatus according to claim 7, wherein:
   the sensor is configured to detect presence or absence of the packages, and
   the controller is configured to decelerate or accelerate the conveyance speeds of the first side-alignment conveyor, the second side-alignment conveyor, and the third side-alignment conveyor, based on the flow rate acquired based on a state of the packages detected by the sensor.

9. The package conveyance apparatus according to claim 7, wherein:
   the controller is configured to decelerate or accelerate the conveyance speeds of the first auxiliary conveyance belt, the second auxiliary conveyance belt, and the third auxiliary conveyance belt, based on the flow rate acquired from the sensor.

10. The package conveyance apparatus according to claim 1, wherein:
    the first auxiliary conveyance belt, the second auxiliary conveyance belt, and the third auxiliary conveyance belt have a higher frictional force with the packages than the first side-alignment conveyor, the second side-alignment conveyor, and the third side-alignment conveyor, respectively.

11. A package supply apparatus comprising a first conveyance portion, the package conveyance apparatus according to claim 1, and a second conveyance portion, wherein:
    the first conveyance portion is configured to remove a plurality of packages from a feeder on which the packages are placed and to convey the packages along the first direction;

the package conveyance apparatus is disposed on a downstream side of the first conveyance portion; and
the second conveyance portion disposed on a downstream side of the package conveyance apparatus and configured to convey the packages while adjusting an interval between the packages.

* * * * *